United States Patent
Miyagawa et al.

(10) Patent No.: US 7,527,756 B2
(45) Date of Patent: May 5, 2009

(54) MOLD TEMPERATURE ADJUSTING APPARATUS/METHOD AND MOLD TEMPERATURE CONTROL UNIT

(75) Inventors: Satoshi Miyagawa, Nagoya (JP); Koji Kubota, Nagoya (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 1 day.

(21) Appl. No.: 11/708,561

(22) Filed: Feb. 21, 2007

(65) Prior Publication Data
US 2007/0184139 A1 Aug. 9, 2007

Related U.S. Application Data

(62) Division of application No. 11/045,113, filed on Jan. 31, 2005, now Pat. No. 7,323,127.

(30) Foreign Application Priority Data

| Feb. 12, 2004 | (JP) | ............................... 2004-035189 |
| May 19, 2004 | (JP) | ............................... 2004-148549 |

(51) Int. Cl.
*B29C 45/73* (2006.01)
(52) U.S. Cl. ................. 264/40.6; 264/328.16; 264/327; 425/143
(58) Field of Classification Search ............... 264/40.6, 264/328.16, 327; 425/143, 144, 547, 548, 425/551, 552
See application file for complete search history.

(56) References Cited

U.S. PATENT DOCUMENTS

| 4,548,259 A * | 10/1985 | Tezuka et al. ............... 165/263 |
| 4,623,497 A * | 11/1986 | Waters ....................... 264/40.6 |
| 4,680,001 A | 7/1987 | Waters |

(Continued)

FOREIGN PATENT DOCUMENTS

EP 1 110 692 A1 6/2001

(Continued)

OTHER PUBLICATIONS

Partial European Search Report in Application No. EP 05 10 0542 dated May 18, 2005.

(Continued)

*Primary Examiner*—Steven P Griffin
*Assistant Examiner*—Seyed Masoud Malekzadeh
(74) *Attorney, Agent, or Firm*—Westerman, Hattori, Daniels & Adrian, LLP.

(57) ABSTRACT

A mold temperature adjusting apparatus is provided in which change-over timing of high temperature medium and low temperature medium is adjusted by a heat transmission delay in heating and cooling of a mold being taken into consideration. The mold temperature adjusting apparatus comprises a high temperature fluid tank and a low temperature fluid tank, a high temperature fluid supply system and a high temperature fluid return system between the mold and the high temperature fluid tank, a low temperature fluid supply system and a low temperature fluid return system between the mold and the low temperature fluid tank, a high temperature fluid by-pass system and a low temperature fluid by-pass system, a heat recovery tank connected to the high temperature fluid tank and a pressure adjusting device.

6 Claims, 17 Drawing Sheets

U.S. PATENT DOCUMENTS

| | | | |
|---|---|---|---|
| 4,902,454 A * | 2/1990 | Steinbichler et al. | 264/40.6 |
| 5,062,786 A * | 11/1991 | Arai | 425/174 |
| 5,355,938 A * | 10/1994 | Hosoya et al. | 165/263 |
| 5,411,686 A | 5/1995 | Hata | |
| 5,427,720 A | 6/1995 | Kotzab | |
| 5,551,857 A * | 9/1996 | Fujioka et al. | 425/143 |
| 5,591,385 A * | 1/1997 | Arai et al. | 264/40.6 |
| 5,683,633 A | 11/1997 | Liehr et al. | |
| 5,720,912 A | 2/1998 | Liehr et al. | |
| 6,280,665 B1 * | 8/2001 | Kotzab | 264/40.6 |
| 6,312,628 B1 * | 11/2001 | Wieder et al. | 264/37.27 |
| 6,790,388 B2 * | 9/2004 | Chiu et al. | 264/2.2 |

FOREIGN PATENT DOCUMENTS

| | | |
|---|---|---|
| EP | 1 493 544 A1 | 1/2005 |
| JP | 10-34657 | 2/1998 |
| JP | 2002-210740 | 7/2002 |

OTHER PUBLICATIONS

European Search Report dated Apr. 12, 2007, issued in corresponding European Application No. 07 10 4015.

* cited by examiner

MOLD TEMPERATURE ADJUSTING APPARATUS/METHOD AND MOLD TEMPERATURE CONTROL UNIT

This application is a divisional of application Ser. No. 11/045,113, filed Jan. 31, 2005 now U.S. Pat. No. 7,323,127.

BACKGROUND OF THE INVENTION

1. Field of the Invention

The present invention relates to a mold temperature adjusting apparatus and method by which a change-over timing between a high temperature medium and a low temperature medium is appropriately adjusted so as to shorten a molding cycle time. The present invention also relates to a mold temperature control unit of the same concept.

2. Description of the Related Art

In an injection step of an injection molding machine, if a mold temperature is low, a molten resin that is injected makes contact with the mold while pressure in the mold is not elevated yet, so that a resin surface rapidly solidifies and a surface of a molded article often becomes coarse. This is liable to cause a problem that the molten resin is not sufficiently transferred onto a cavity surface of the mold. In order to avoid this problem, it is necessary to elevate the mold temperature so that solidification of the surface of the molten resin is delayed. On the other hand, once the resin is filled in the mold, it is preferable that the mold temperature is lowered so that cooling is expedited and the injection step cycle is shortened. In the recent molds, there are devised and provided various mold temperature adjusting apparatus and methods by which such mold temperature can be quickly elevated or lowered. However, as the mold generally has a large thermal capacity, if large amounts of high temperature medium and low temperature medium as heat medium fluids are alternately changed over to be supplied, it is necessary to devise a change-over means so that the high temperature medium and low temperature medium are not mixed with each other. Also, it is necessary to provide a high temperature medium recovery means so as to suppress a heat loss of the heat medium.

In a conventional heating/cooling change-over apparatus, a recovery tank exclusive for the high temperature medium and a recovery tank exclusive for the low temperature medium are provided. When a mold heating step is to be changed over to a mold cooling step, the high temperature medium remaining in a temperature adjusting passage in the mold is pushed out from the temperature adjusting passage by the low temperature medium newly supplied into the temperature adjusting passage to be recovered into the recovery tank exclusive for the high temperature medium. Also, when the mold cooling step is to be changed over to the mold heating step, the low temperature medium remaining in the temperature adjusting passage is pushed out from the temperature adjusting passage by the high temperature medium newly supplied into the temperature adjusting passage to be recovered into the recovery tank exclusive for the low temperature medium. This is disclosed in the Japanese laid-open patent application 1998-34657 as Patent Document 1, for example.

In another conventional example of a heating/cooling change-over apparatus and a mold heating/cooling change-over method, the number of the recovery tanks is reduced, whereby only the high temperature fluid is recovered so as to lessen the thermal energy loss. That is, there are provided a high temperature fluid passage system comprising a circulating passage, a pump transferring a fluid and a heater heating the fluid and also comprising an opening/closing valve enabling a change-over of the high temperature fluid passage system between a communicating state and a non-communicating state, a temperature adjusting passage (a fluid passage provided in a mold, a fluid supply and return passage), a recovery tank arranged in the high temperature fluid passage system and a discharge valve discharging the fluid stored in the recovery tank outside of the system. Thereby, when the mold cooling step is to be changed over to the mold heating step, the low temperature fluid remaining in the temperature adjusting passage is recovered into the recovery tank. Also, when the mold heating step is to be changed over to the mold cooling step, the high temperature fluid remaining in the temperature adjusting passage is recovered into the recovery tank. This is disclosed in the Japanese laid-open patent application 2002-210740 as Patent Document 2, for example.

In the heating/cooling change-over apparatus of the above-mentioned Patent Document 1, there are needed two recovery tanks on the high temperature side and the low temperature side as the fluid medium recovery tank. Also, the high temperature medium is left as it is in the recovery tank in the mold cooling step. Hence, the temperature is considerably reduced by a radiation and when this high temperature medium is returned into the high temperature medium passage, it is mixed with a high temperature medium of which, temperature has been adjusted to an appropriate high temperature and there arises a problem that the temperature is reduced.

Also, in the heating/cooling change-over apparatus and mold heating/cooling change-over method of the above-mentioned Patent Document 2, while the low temperature fluid recovered into the recovery tank is discharged out of the system, the recovery tank is cooled by the recovery of the low temperature fluid so that the recovered high temperature fluid also is cooled in the recovery tank. Thus, when this recovered high temperature fluid is recovered into the high temperature fluid passage system, the temperature of the high temperature fluid is reduced and there arises a problem that the high temperature fluid is to be re-heated in the high temperature fluid passage system so that a temperature adjustment is carried out.

SUMMARY OF THE INVENTION

In view of the above-mentioned problems, the present invention is proposed with an object to provide a mold temperature adjusting apparatus and method as well as a mold temperature control unit by which a change-over timing between a high temperature medium and a low temperature medium is adjusted, wherein a delay of heat transmission both in heating and cooling of the high temperature medium and low temperature medium is taken into consideration so that a cycle time of the molding steps is shortened, temperature changes relative to respective set temperatures of the high temperature medium and low temperature medium are reduced and an energy loss is reduced to thereby obtain an optimal mold temperature in the injection step.

In order to solve the above-mentioned object, the present invention provides the following means (1) to (27):

(1) A first means is a mold temperature adjusting apparatus comprising a high temperature fluid tank having a temperature adjusting means adjusting temperature of a fluid to a set high temperature, a high temperature fluid supply system having a high temperature fluid transfer pump supplying the fluid of high temperature into a mold from the high temperature fluid tank, a high temperature fluid return system returning the fluid into the high temperature fluid tank from the mold, a low temperature fluid tank having a temperature adjusting means adjusting temperature of the fluid to a set low temperature, a low temperature fluid supply system having a low temperature fluid transfer pump supplying the fluid of low temperature into the mold from the low temperature fluid tank and a low temperature fluid return system returning the fluid into the low temperature fluid tank from the mold so that a control of a mold temperature of the mold is effected such that the fluid of high temperature from the high temperature fluid tank and the fluid of low temperature from the low temperature fluid tank re selectively changed over from one to the other to flow through a fluid passage provided in the mold, characterized in that the mold temperature adjusting apparatus further comprises a high temperature fluid by-pass system connecting the high temperature fluid supply system and the high temperature fluid return system to each other, a low temperature fluid by-pass system connecting the low temperature fluid supply system and the low temperature fluid return system to each other, a heat recovery tank having its upper portion connected to the high temperature fluid tank and its lower portion connected to the low temperature fluid supply system as well as having a means preventing the fluids of high temperature and low temperature from mixing with each other in the heat recovery tank and a pressure adjusting system connecting the heat recovery tank and the low temperature fluid tank to each other as well as having a pressure adjusting means.

(2) A second means is a heat recovery tank used in a mold temperature adjusting apparatus, characterized in that the heat recovery tank comprises an upper inlet/outlet port and a lower inlet/outlet port of a fluid, the upper inlet/outlet port and lower inlet/outlet port being horizontally constructed along an inner surface of the heat recovery tank so as to minimize a vertical dynamic pressure when the fluid is fed in or fed out, a multi-hole plate provided in each of an upper portion and a lower portion of the heat recovery tank so as to cause a flow resistance of the fluid and a means maintaining a boundary between the fluid of high temperature and the fluid of low temperature by a temperature difference between them so as to suppress a convection of the fluid.

(3) A third means is a heat recovery tank used in a mold temperature adjusting apparatus, as mentioned in the first means, characterized in that the multi-hole plate is formed in a cylindrical or polygonal shape and is vertically provided in each of a tank high temperature fluid side portion and a tank low temperature fluid side portion so as to separate the vicinity of the inlet/outlet port of the fluid and a tank body portion of the heat recovery tank from each other to thereby construct the heat recovery tank such that the fluid horizontally flows in and flows out through the multi-hole plate from a circumferential direction of the tank and, where dl is a hole diameter of each of multi-holes of the multi-hole plate and vl is a flow velocity of the fluid flowing in the tank body portion from the holes of the multi-hole plate, the heat recovery tank is designed so that Ri represented by the following equation becomes 10 or more:

$$Ri = \Delta\rho \cdot g \cdot dl / (\rho mean \cdot vl^2)$$

Here, g is the gravitational acceleration, $\Delta\rho$ is a density difference between the fluid of high temperature and the fluid of low temperature and $\rho$ mean is a mean density of the fluid.

(4) A fourth means is a heat recovery tank used in a mold temperature adjusting apparatus, as mentioned in the second means, characterized in that the means maintaining the boundary is a plurality of rectifying plates vertically arranged with a predetermined gap being maintained between each of the rectifying plates.

(5) A fifth means is a heat recovery tank used in a mold temperature adjusting apparatus, as mentioned in the second means, characterized in that the means maintaining the boundary is constructed such that a guide bar is vertically provided being fixed to a bottom central portion of the heat recovery tank, a float disc, having an outer diameter slightly larger than an inner diameter of the heat recovery tank and having its central portion fixed with a guide pipe of an appropriate length elongating perpendicularly to a disc plane of the float disc, is provided so that the guide bar is loosely inserted into the guide pipe, the float disc is made of a heat insulating material and has an integrated density of a middle value between a density of the fluid of high temperature and that of the fluid of low temperature and, when the fluid of high temperature is fed into an upper portion of the heat recovery tank and the fluid of low temperature is fed into a lower portion of the heat recovery tank, the float disc moves up and down corresponding to an upward and downward movement of the boundary between the fluid of high temperature and the fluid of low temperature caused by feed-in and feed-out of the fluid to thereby prevent the fluid of high temperature and the fluid of low temperature from mixing with each other.

(6) A sixth means is a heat recovery tank used in a mold temperature adjusting apparatus, as mentioned in the fifth means, characterized in that the float disc is formed having a shape of a bag filled with the fluid and provided being horizontally maintained by the guide pipe.

(7) A seventh means is a heat recovery tank used in a mold temperature adjusting apparatus, as mentioned in any one of the second to the sixth means, characterized in that a heat insulating material is applied to or coated on an inner surface of the heat recovery tank existing in the range in which the boundary between the fluid of high temperature and the fluid of low temperature moves up and down.

(8) An eighth means is a mold temperature adjusting method in an injection molding step using the mold temperature adjusting apparatus, as mentioned in the first means, the injection molding step being of heating the mold before filling a molten resin and cooling the mold after filling the resin, characterized in that the mold temperature adjusting method comprises the steps of: by detecting a mold temperature T by a mold temperature sensor, previously setting a heating over-shooting temperature correction value $\Delta TH$ for a mold heating, a cooling under-shooting temperature correction value $\Delta TL$ for a mold cooling, a resin filling start mold temperature TH for starting a filling step, a mold opening start temperature TL, an over-shooting time S1 and an under-shooting time S2 as well as calculating a high temperature fluid stop temperature $TH-\Delta TH$ by subtracting the heating over-shooting temperature correction value $\Delta TH$ from the resin filling start mold temperature TH and calculating a low temperature fluid stop temperature $TL+\Delta TL$ by adding the cooling under-shooting temperature correction value $\Delta TL$ to the mold opening start temperature TL; supplying the fluid of high temperature into the mold via the high temperature fluid supply system as a mold heating step; stopping the supply of the fluid of high temperature when the mold temperature reaches the high temperature fluid stop temperature $TH-\Delta TH$ as well as opening the high temperature fluid by-pass system during the over-shooting time S1 so as to cause the fluid of high temperature to by-pass; starting the filling step when the mold temperature T reaches the resin filling start mold temperature TH; closing the high temperature fluid by-pass system after the over-shooting time S1 has passed as well as opening a passage connecting to the heat recovery tank from the mold; supplying the fluid of low temperature into the mold via the low temperature fluid supply system so that the fluid of high temperature remaining in the fluid passage of the mold is recovered into the heat recovery tank via the high temperature fluid tank as well as continuing a mold cooling step by supplying the fluid of low temperature into the mold via the low temperature fluid supply system; stopping the supply of the fluid of low temperature into the mold when the mold temperature T reaches the low temperature fluid stop temperature TL+ΔTL as well as opening the low temperature fluid by-pass system during the under-shooting time S2 so as to cause the fluid of low temperature to by-pass; closing the low temperature fluid by-pass system when the mold temperature T reaches the mold opening start temperature TL to thereby finish the mold cooling step; opening the mold and taking out a molded article; after the under-shooting time S2 has passed, recovering the fluid of low temperature into the heat recovery tank by pushing by the fluid of high temperature; and continuously supplying the fluid of high temperature into the mold to thereby return to the mold heating step.

(9) A ninth means is a mold temperature adjusting method as mentioned in the eighth means, characterized in further comprising the steps of: in the mold cooling step and in a replacement step replacing the fluid of high temperature with the fluid of low temperature, closing the low temperature fluid by-pass system and in the mold heating step, opening the low temperature fluid by-pass system as well as continuously operating the low temperature fluid transfer pump: likewise, in the mold heating step and in a replacement step replacing the fluid of low temperature with the fluid of high temperature, closing the high temperature fluid by-pass system and in the mold cooling step, opening the high temperature fluid by-pass system as well as continuously operating the high temperature fluid transfer pump, so that temperatures of supply pipings and return pipings of both of the fluid of high temperature and the fluid of low temperature are maintained as well as the fluid of high temperature remaining in the mold and the fluid of low temperature remaining in the mold are recovered into the high temperature fluid tank and the low temperature fluid tank, respectively.

(10) A tenth means is a mold temperature adjusting method as mentioned in the eighth or ninth means, characterized in that pressure in piping systems is maintained higher by the low temperature fluid transfer pump being continuously operated as well as by the pressure adjusting system so that a vaporizing temperature of the fluid is maintained higher and the mold can be controlled in a higher temperature.

(11) An eleventh means is a mold temperature control unit performing a control of heating the mold before filling a molten resin and cooling the mold after filling the resin by the mold temperature adjusting apparatus as mentioned in the first means, characterized in that the mold temperature control unit performs the control comprising the steps of: by receiving a signal of a mold temperature T detected by a mold temperature sensor, previously setting a heating over-shooting temperature correction value ΔTH for a mold heating, a cooling under-shooting temperature correction value ΔTL for a mold cooling, a resin filling start mold temperature TH for starting a filling step, a mold opening start temperature TL, an over-shooting time S1 and an under-shooting time S2 as well as calculating a high temperature fluid stop temperature TH−ΔTH by subtracting the heating over-shooting temperature correction value ΔTH from the resin filling start mold temperature TH and calculating a low temperature fluid stop temperature TL+ΔTL by adding the cooling under-shooting temperature correction value ΔTL to the mold opening start temperature TL; supplying the fluid of high temperature into the mold via the high temperature fluid supply system as a mold heating step; stopping the supply of the fluid of high temperature when the mold temperature T reaches the high temperature fluid stop temperature TH−ΔTH as well as opening the high temperature fluid by-pass system during the over-shooting time S1 so as to cause the fluid of high temperature to by-pass; starting the filling step when the mold temperature T reaches the resin filling start mold temperature TH; closing the high temperature fluid by-pass system after the over-shooting time S1 has passed as well as opening a passage connecting to the heat recovery tank from the mold; supplying the fluid of low temperature into the mold via the low temperature fluid supply system so that the fluid of high temperature remaining in the fluid passage of the mold is recovered into the heat recovery tank via the high temperature fluid tank as well as continuing a mold cooling step by supplying the fluid of low temperature into the mold via the low temperature fluid supply system; stopping the supply of the fluid of low temperature into the mold when the mold temperature T reaches the low temperature fluid stop temperature TL+ΔTL as well as opening the low temperature fluid by-pass system during the under-shooting time S2 so as to cause the fluid of low temperature to by-pass; closing the low temperature fluid by-pass system when the mold temperature T reaches the mold opening start temperature TL to thereby finish the mold cooling step; opening the mold and taking out a molded article; after the under-shooting time S2 has passed, recovering the fluid of low temperature into the heat recovery tank by pushing by the fluid of high temperature; and continuously supplying the fluid of high temperature into the mold to thereby return to the mold heating step.

(12) A twelfth means is a mold temperature control unit performing a control of temperature of a mold by a predetermined high temperature fluid and low temperature fluid being selectively caused to flow in the mold, characterized in that the mold temperature control unit performs the control comprising the steps of: by receiving a signal of a mold temperature detected by a mold temperature sensor, previously setting a heating over-shooting temperature correction value ΔTH of the mold, a cooling under-shooting temperature correction value ΔTL of the mold, a resin filling start mold temperature TH for starting a filling step and a mold opening start temperature TL as well as calculating a high temperature fluid stop temperature TH−ΔTH by subtracting the heating over-shooting temperature correction value ΔTH from the resin filling start mold temperature TH and calculating a low temperature fluid stop temperature TL+ΔTL by adding the cooling under-shooting temperature correction value ΔTL to the mold opening start temperature TL; supplying the high temperature fluid into the mold for heating the mold; stopping the supply of the high temperature fluid when a mold temperature T of the mold reaches the high temperature fluid stop temperature TH−ΔTH; supplying the low temperature fluid into the mold for cooling the mold; and stopping the supply of the low temperature fluid when the mold temperature T reaches the low temperature fluid stop temperature TL+ΔTL.

(13) A thirteenth means is a mold temperature adjusting apparatus performing a temperature control of a mold by a predetermined high temperature heat medium and low temperature heat medium being selectively caused to flow in a heat medium passage provided in the mold, characterized in that the mold temperature adjusting apparatus comprises a mold temperature sensor actually measuring a mold temperature of the mold and a mold temperature control means performing a control including the steps of; while the mold is heated, stopping supply of the high temperature heat medium into the mold when the mold temperature is elevated to a high temperature fluid stop temperature TH−ΔTH obtained by subtracting a heating over-shooting temperature correction value ΔTH from a predetermined resin filling start mold temperature TH and while the mold is cooled, stopping supply of the low temperature heat medium into the mold when the mold temperature is lowered to a low temperature fluid stop temperature TL+ΔTL obtained by adding a cooling under-shooting temperature correction value ΔTL to a predetermined mold opening start temperature TL, the heating over-shooting temperature correction value ΔTH being a predicted elevated temperature value regulating a supply stop timing of the high temperature heat medium so that over-shooting of the mold temperature is suppressed, the cooling under-shooting temperature correction value ΔTL being a predicted lowered temperature value regulating a supply stop timing of the low temperature heat medium so that under-shooting of the mold temperature is suppressed.

(14) A fourteenth means is a mold temperature adjusting apparatus as mentioned in the thirteenth means, characterized in that the mold temperature control means recognizes a progress of temperature elevation corresponding to the heating over-shooting temperature correction value ΔTH by the mold temperature sensor actually measuring the mold temperature or by a timer means measuring an over-shooting time S1 predicted as needed for the mold temperature to be elevated to the resin filling start mold temperature TH from the high temperature fluid stop temperature TH−ΔTH as well as recognizes a progress of temperature lowering corresponding to the cooling under-shooting temperature correction value ΔTL by the mold temperature sensor actually measuring the mold temperature or by a timer means measuring an under-shooting time S2 predicted as needed for the mold temperature to be lowered to the mold opening start temperature TL from the low temperature fluid stop temperature TL+ΔTL.

(15) A fifteenth means is a mold temperature adjusting apparatus as mentioned in the thirteenth means, characterized in that the mold temperature control means is constructed such that the supply of the high temperature heat medium into the mold is started when the mold temperature is lowered to a high temperature heat medium supply start temperature set value TL+ΔTL2 obtained by adding a high temperature heat medium supply start temperature correction value ΔTL2, which is smaller than the cooling under-shooting temperature correction value ΔTL (ΔTL2<ΔTL), to the low temperature fluid stop temperature TL and the supply of the low temperature heat medium into the mold is started when the mold temperature is elevated to the resin filling start mold temperature TH.

(16) A sixteenth means is a mold temperature adjusting apparatus as mentioned in the fifteenth means, characterized in that the mold temperature control means recognizes the time when the mold temperature is lowered to the high temperature heat medium supply start temperature set value TL+ΔTL2 by the mold temperature sensor actually measuring the high temperature heat medium supply start temperature set value TL+ΔTL2 or by a timer means measuring a low temperature maintaining time set value SH predicted as needed for the mold temperature to be lowered to the high temperature heat medium supply start temperature set value TL+ΔTL2 from the low temperature fluid stop temperature TL+ΔTL.

(17) A seventeenth means is a mold temperature adjusting apparatus as mentioned in the fifteenth means, characterized in further comprising a temperature control condition setting means setting mold temperature control conditions of the temperatures of the high temperature heat medium and low temperature heat medium, resin filling start mold temperature TH, heating over-shooting temperature correction value ΔTH, mold opening start temperature TL, cooling under-shooting temperature correction value ΔTL and high temperature heat medium supply start temperature correction value ΔTL2 and an image displaying panel displaying the mold temperature control conditions in a molding step as well as displaying actually measured temperature changes of the mold in an actual molding step.

(18) An eighteenth means is a mold temperature adjusting apparatus as mentioned in the seventeenth means, characterized in that the image displaying panel is constructed such that the mold temperature control conditions and actually measured temperature changes are changed over to each other to be displayed on the same one screen.

(19) A nineteenth means is a mold temperature adjusting apparatus as mentioned in the seventeenth means, characterized in further comprising a means predicting the heating over-shooting temperature correction value ΔTH based on a time constant of temperature changes of the mold when the mold as a single unit is heated as well as predicting the cooling under-shooting temperature correction value ΔTL based on a time constant of temperature changes of the mold when the mold as a single unit is cooled.

(20) A twentieth means is a mold temperature adjusting apparatus as mentioned in the fifteenth means, characterized in that the mold is a mold of an injection molding machine controlled by a molding machine control means having an injection molding condition setting and image displaying panel and the injection molding condition setting and image displaying panel is provided with a temperature control condition setting means setting mold temperature control conditions of the temperatures of the high temperature heat medium and low temperature heat medium, resin filling start mold temperature TH, heating over-shooting temperature correction value ΔTH, mold opening start temperature TL, cooling under-shooting temperature correction value ΔTL and high temperature heat medium supply start temperature correction value ΔTL2 as well as is constructed so as to display thereon the mold temperature control conditions set by the temperature control condition setting means and actually measured temperature values of the mold in an actual molding step.

(21) A twenty-first means is a mold temperature adjusting method performing a control of temperature of a mold by a high temperature heat medium and low temperature heat medium of predetermined temperatures being selectively caused to flow in a heat medium passage provided in the mold, characterized in that the mold temperature adjusting method includes the steps of: actually measuring a mold temperature of the mold; and while the mold is heated, stopping supply of the high temperature heat medium into the mold when the mold temperature is elevated to a high temperature fluid stop temperature TH−ΔTH obtained by subtracting a heating over-shooting temperature correction value ΔTH from a resin filling start mold temperature TH of a predetermined resin and while the mold is cooled, stopping supply of the low temperature heat medium into the mold (2) when the mold temperature is lowered to a low temperature fluid stop temperature TL+ΔTL obtained by adding a cooling under-shooting temperature correction value ΔTL to a predetermined mold opening start temperature TL, the heating over-shooting temperature correction value ΔTH being a predicted elevated temperature value regulating a supply stop timing of the high temperature heat medium so that over-shooting of the mold temperature is suppressed, the cooling under-shooting temperature correction value ΔTL being a predicted lowered temperature value regulating a supply stop timing of the low temperature heat medium so that under-shooting of the mold temperature is suppressed.

(22) A twenty-second means is a mold temperature adjusting method as mentioned in the twenty-first means, characterized in that a progress of temperature elevation corresponding to the heating over-shooting temperature correction value ΔTH is recognized by the mold temperature sensor actually measuring the mold temperature or by a timer means measuring an over-shooting time S1 predicted as needed for the mold temperature to be elevated to the resin filling start mold temperature TH from the high temperature fluid stop temperature TH−ΔTH as well as a progress of temperature lowering corresponding to the cooling under-shooting temperature correction value ΔTL is recognized by the mold temperature sensor actually measuring the mold temperature or by a timer means measuring an under-shooting time S2 predicted as needed for the mold temperature to be lowered to the mold opening start temperature TL from the low temperature fluid stop temperature TL+ΔTL.

(23) A twenty-third means is a mold temperature adjusting method as mentioned in the twenty-second means, characterized in that the over-shooting time S1 is predicted based on a time constant of temperature changes of the mold when the mold as a single unit is heated as well as the under-shooting time S2 is predicted based on a time constant of temperature changes of the mold when the mold as a single unit is cooled.

(24) A twenty-fourth means is a mold temperature adjusting method as mentioned in the twenty-second means, characterized in that the supply of the high temperature heat medium into the mold is started when the mold temperature is lowered to a high temperature heat medium supply start temperature set value TL+ΔTL2 obtained by adding a high temperature heat medium supply start temperature correction value ΔTL2, which is smaller than the cooling under-shooting temperature correction value ΔTL (ΔTL2<ΔTL), to the low temperature fluid stop temperature TL and the supply of the low temperature heat medium into the mold is started when the mold temperature is elevated to the resin filling start mold temperature TH.

(25) A twenty-fifth means is a mold temperature adjusting method as mentioned in the twenty-fourth means, characterized in that the time when the mold temperature is lowered to the high temperature heat medium supply start temperature set value TL+ΔTL2 is recognized by the mold temperature sensor actually measuring the high temperature heat medium supply start temperature set value TL+ΔTL2 or by a timer means measuring a low temperature maintaining time set value SH predicted as needed for the mold temperature to be lowered to the high temperature heat medium supply start temperature set value TL+ΔTL2 from the low temperature fluid stop temperature TL+ΔTL.

(26) A twenty-sixth means is a mold temperature adjusting method as mentioned in the twenty-fourth means, characterized in further including the steps of: setting mold temperature control conditions of the temperatures of the high temperature heat medium and low temperature heat medium, resin filling start mold temperature TH, heating over-shooting temperature correction value ΔTH, mold opening start temperature TL, cooling under-shooting temperature correction value ΔTL and high temperature heat medium supply start temperature correction value ΔTL2; and displaying on an injection molding condition setting and image displaying panel a first image showing a reference mold temperature curve of a molding step added with the mold temperature control conditions and a second image showing actually measured temperature changes of the mold in an actual molding step.

(27) A twenty-seventh means is a mold temperature adjusting method as mentioned in the twenty-first means, characterized in that the heating over-shooting temperature correction value ΔTH is predicted based on a time constant of temperature changes of the mold when the mold as a single unit is heated and the cooling under-shooting temperature correction value ΔTL is predicted based on a time constant of temperature changes of the mold when the mold as a single unit is cooled.

As the invention of Claim 1 employs the above-mentioned first means, after the mold is heated, the fluid of high temperature is recovered not only into the high temperature fluid tank but also into the heat recovery tank. Hence, no surplus fluid of high temperature is needed to be discharged outside and also the fluid of high temperature recovered into the heat recovery tank can be re-used at the time of mold re-heating. Thus, a heat loss of the fluid or heat medium can be reduced. Moreover, as a high temperature portion of the apparatus is always pressurized by the high temperature fluid transfer pump and pressure adjusting system, the fluid is in no case vaporized.

As the invention of claim 2 employs the above-mentioned second means, the fluids of high temperature and low temperature can be recovered by a simple structure and making up of the fluid from outside becomes almost unnecessary.

As the invention of claim 3 employs the above-mentioned third means, the design is made such that the function Ri (Richardson number) representing the relation between the hole diameter of the hole of the multi-hole plate and the energy by the flow velocity passing through the hole of the multi-hole plate becomes 10 or more. Hence, in addition to the effect of the invention of claim 2, irregularity of the boundary between the fluid of high temperature and the fluid of low temperature in the heat recovery tank is reduced and mixing of the fluids can be suppressed.

As the invention of claim 4 employs the above-mentioned fourth means, the boundary surface area of the boundary generated by the specific gravity difference between the fluid of high temperature and the fluid of low temperature is separated into small units by the rectifying plates. Hence, in addition to the effect of the invention of claim 2, mixing of the fluids can be further reduced.

As the invention of claim 5 employs the above-mentioned fifth means, in addition to the effect of the invention of claim 5, the fluid of high temperature and the fluid of low temperature can be completely partitioned from each other by the float disc, and heat transmission to the fluid of low temperature from the fluid of high temperature can be reduced.

As the invention of claim 6 employs the above-mentioned sixth means, in addition to the effect of the invention of claim 5, the float disc is made in the form of the bag filled with the fluid and the float disc can be securely floated in the boundary between the fluid of high temperature and the fluid of low temperature.

As the invention of claim 7 employs the above-mentioned seventh means, in addition to the effect of the invention of any one of the second to the sixth means, heat escaping from the fluid of high temperature through a wall of the heat recovery tank can be reduced and an energy saving effect can be obtained.

As the invention of claim 8 employs the above-mentioned eighth means, each change-over of the fluids is performed earlier by the time needed for elevation of the heating over-shooting temperature as well as by the time needed for lowering of the cooling under-shooting temperature. Thereby, the time of the molding steps can be shortened. Also, the fluid of high temperature and the fluid of low temperature are alternately replaced with each other in the single heat recovery tank. Hence, the facilities can be simplified and the heat loss of the fluid as a heat medium can be reduced.

As the invention of claim 9 employs the above-mentioned ninth means, with respect to both of the fluid of high temperature and the fluid of low temperature, the temperature of the most part of the supply pipings and return pipings can be maintained constant. Thus, in addition to the effect of the invention of claim 8, the heat loss becomes less and the recovery effect of the fluid or heat medium becomes large. Also, frequent starts and stops of the pumps are not needed so that the operation becomes smooth and the mechanical durability is enhanced.

As the invention of claim 10 employs the above-mentioned tenth means, in addition to the effect of the invention of claim 8 or 9, the pressure of the piping system can be maintained higher and the temperature of the fluid can be controlled in a higher temperature (150 to 160° C.) that is needed by the mold.

As the invention of claim 11 or 12 employs the above-mentioned eleventh or twelfth means, at the time of heating the mold, the supply of the fluid of high temperature into the mold is stopped when the detected mold temperature T is elevated to the high temperature fluid stop temperature TH−ΔTH obtained by subtracting the heating over-shooting temperature correction value ΔTH from the predetermined resin filling start temperature value TH. Also, at the time of cooling the mold, the supply of the fluid of low temperature into the mold is stopped when the detected mold temperature T is lowered to the low temperature fluid stop temperature TL+ΔTL obtained by adding the cooling under-shooting temperature correction value ΔTL to the predetermined mold opening start temperature TL. Thus, the over-shooting or under-shooting of the mold temperature is suppressed to the minimum and the molding cycle time can be shortened.

According to the inventions of claims 13 to 27, at the time of heating the mold, the supply of the high temperature heat medium into the mold is stopped when the mold temperature is elevated to the high temperature fluid stop temperature TH−ΔTH obtained by subtracting the heating over-shooting temperature correction value ΔTH from the predetermined resin filling start temperature value TH. Also, at the time of cooling the mold, the supply of the low temperature heat medium into the mold is stopped when the mold temperature is lowered to the low temperature fluid stop temperature TL+ΔTL obtained by adding the cooling under-shooting temperature correction value ΔTL to the predetermined mold opening start temperature TL. Thus, the over-shooting or under-shooting of the mold temperature is not substantially caused and the molding cycle time can be shortened.

Also, according to the present inventions, the heating over-shooting temperature correction value ΔTH is predicted based on the time constant of the actually measured temperature changes when the mold as a single unit is heated. Also, the cooling under-shooting temperature correction value ΔTL is predicted based on the time constant of the actually measured temperature changes when the mold as a single unit is cooled. Hence, the heating over-shooting temperature correction value ΔTH and cooling under-shooting temperature correction value ΔTL can be optimally set.

Further, according to the inventions of claims 17, 18, 20 and 26, the temperature control condition setting means for setting the mold temperature control conditions is provided in the injection molding condition setting and displaying means provided on the molding machine control means that controls the injection molding machine. The mold temperature control conditions set by this temperature control condition setting means and the actually measured values of the mold in the actual molding step are displayed on the injection molding condition setting and displaying means. Hence, to separately provide a temperature control condition setting means and a displaying means on the mold control unit is not necessary. Thus, the cost of the apparatus can be reduced.

DESCRIPTION OF THE PREFERRED EMBODIMENTS

Herebelow, embodiments according to the present invention will be described with reference to appended drawings.

First Embodiment

Figure 1:
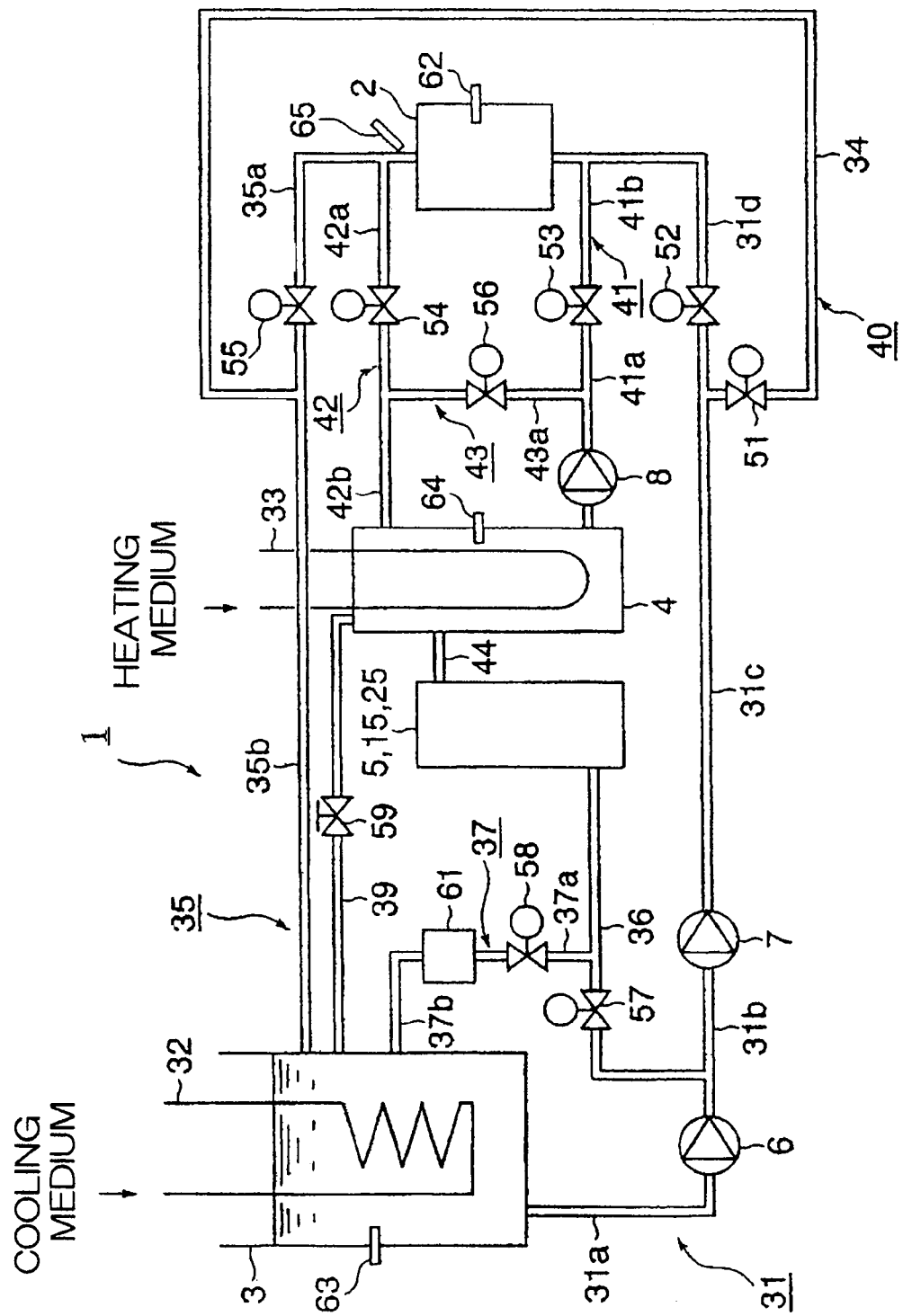
FIG. 1 is a schematic piping diagram of a mold temperature adjusting apparatus of a molding machine of a first embodiment according to the present invention.
Figure 2:
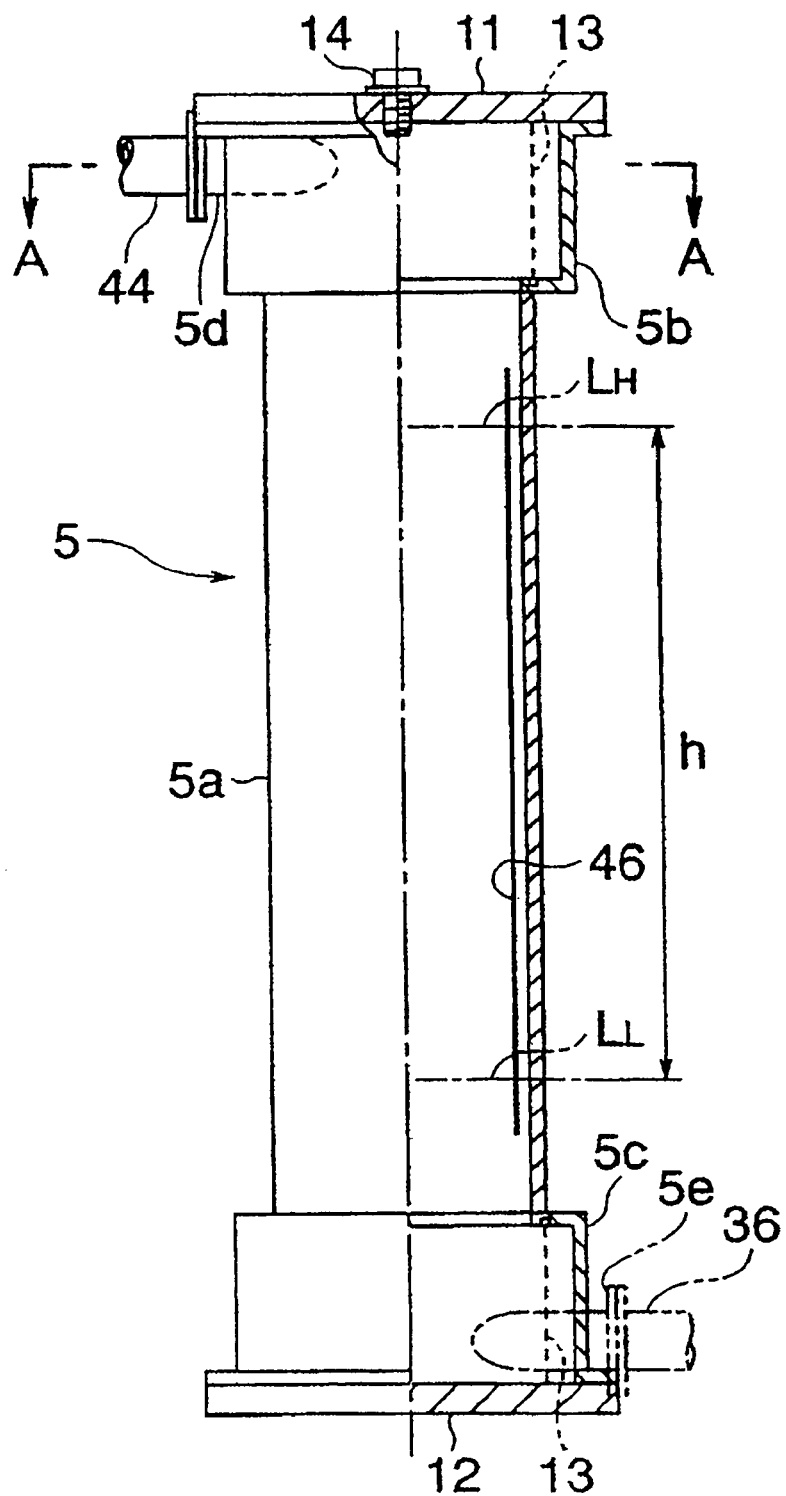
FIG. 2 is a partially cross sectional side view showing a first example of a concrete construction of a heat recovery tank of the mold temperature adjusting apparatus of the first embodiment of FIG. 1.
Figure 3:
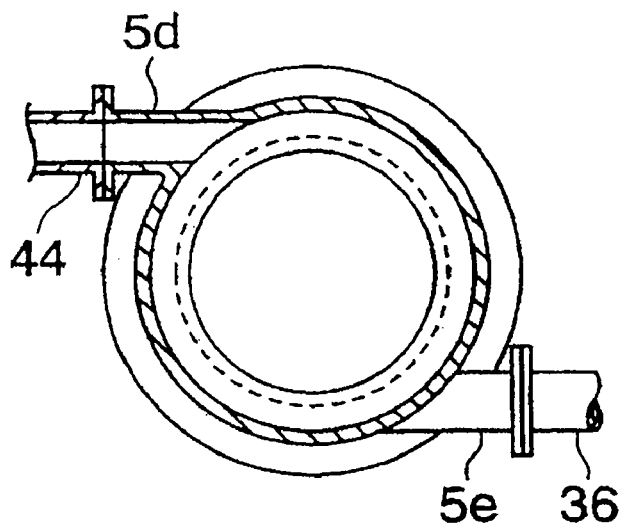
FIG. 3 is a cross sectional view taken on line A-A of FIG. 2.
Figure 4:
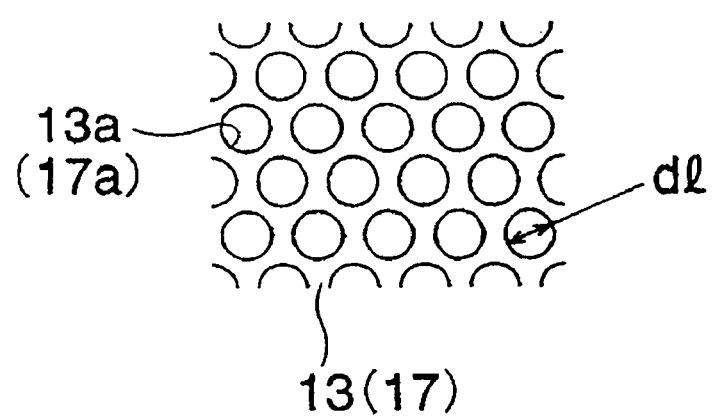
FIG. 4 is an enlarged partial side view showing a hole arrangement of a multi-hole plate of the heat recovery tank of FIG. 2.

FIG. 1 is a schematic piping diagram of a mold temperature adjusting apparatus of a molding machine of a first embodiment according to the present invention, FIG. 2 is a partially cross sectional side view showing a first example of a concrete construction of a heat recovery tank of the mold temperature adjusting apparatus of the present first embodiment, FIG. 3 is a cross sectional view taken on line A-A of FIG. 2 and FIG. 4 is an enlarged partial view showing a hole arrangement of a multi-hole plate of the heat recovery tank of FIG. 2.

Figure 5:
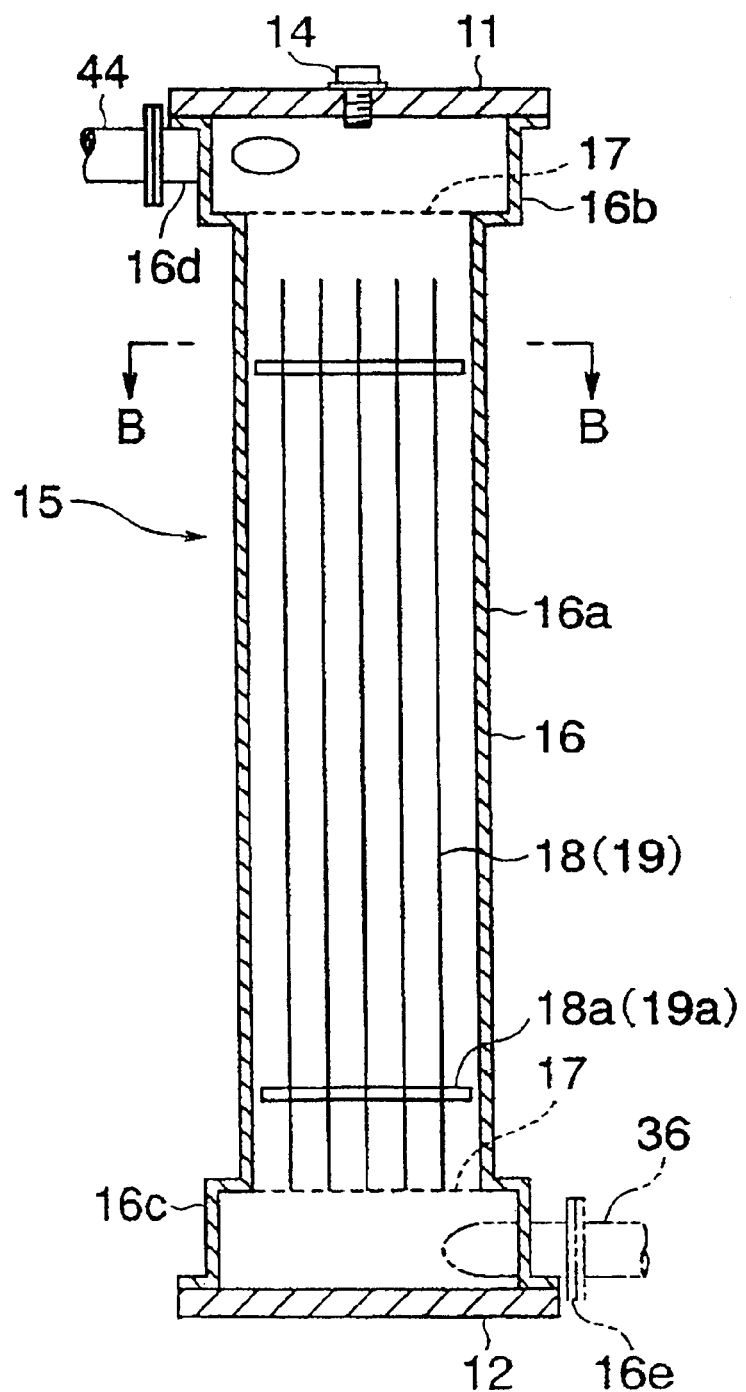
FIG. 5 is a cross sectional side view showing a second example of the concrete construction of the heat recovery tank of the mold temperature adjusting apparatus of the first embodiment of FIG. 1.
Figure 6:
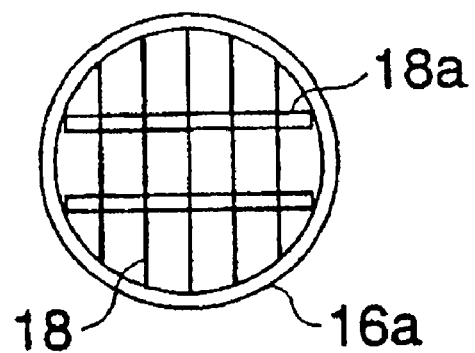
FIG. 6 is a view showing one example of a cross sectional view taken on line B-B of FIG. 5.
Figure 7:
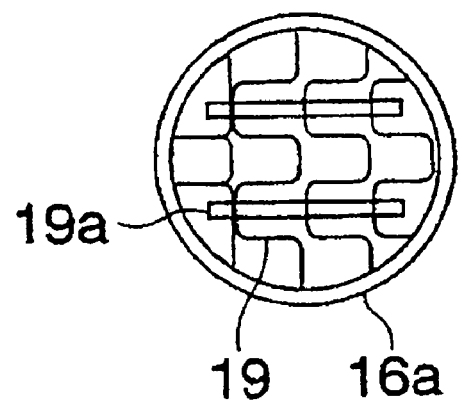
FIG. 7 is a view showing another example of the cross sectional view taken on line B-B of FIG. 5.

FIG. 5 is a cross sectional side view showing a second example of the concrete construction of the heat recovery tank of the mold temperature adjusting apparatus of the present first embodiment, FIG. 6 is a view showing one example of a cross sectional view taken on line B-B of FIG. 5 and FIG. 7 is a view showing another example of the cross sectional view taken on line B-B of FIG. 5.

Figure 8:
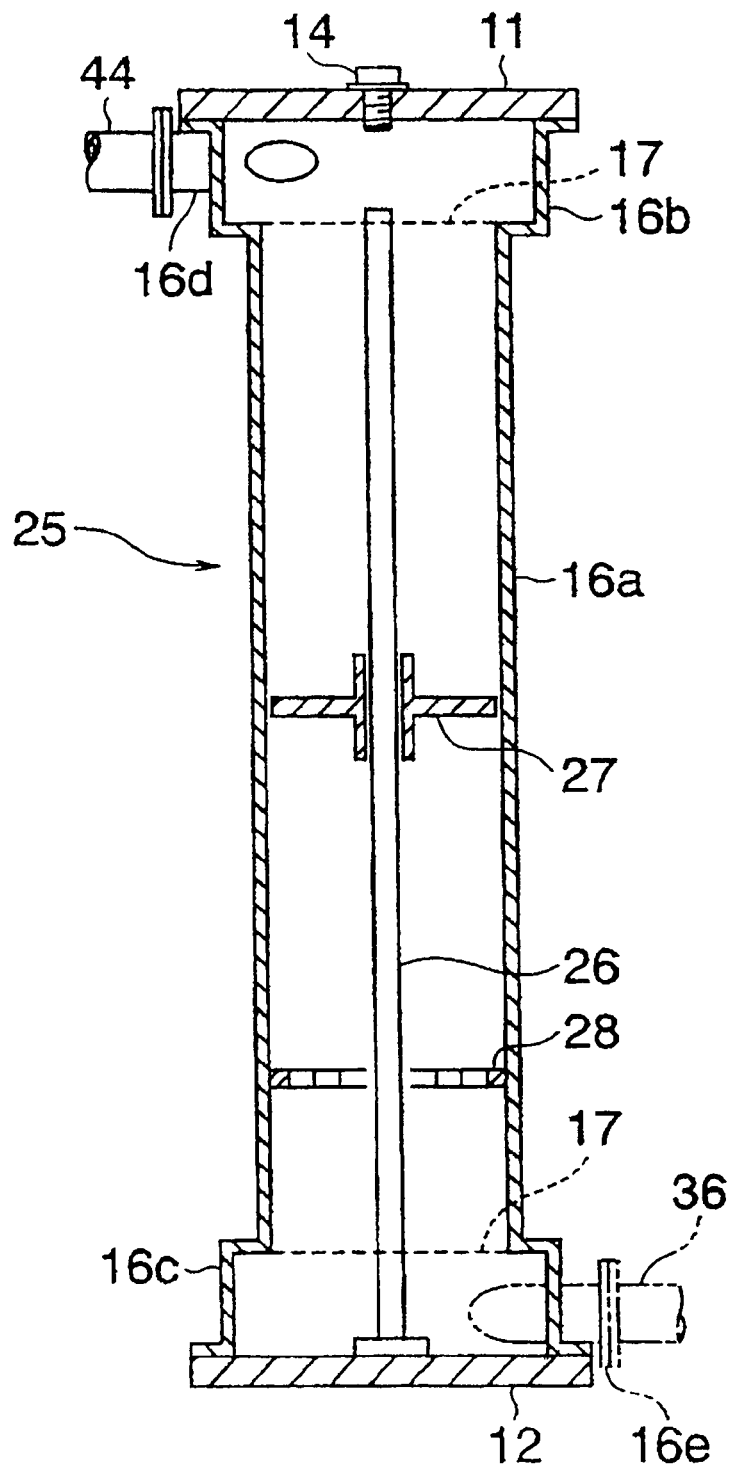
FIG. 8 is a cross sectional side view showing a third example of the concrete construction of the heat recovery tank of the mold temperature adjusting apparatus of the first embodiment of FIG. 1.

FIG. 8 is a cross sectional side view showing a third example of the concrete construction of the heat recovery tank of the mold temperature adjusting apparatus of the present first embodiment.

The mold temperature adjusting apparatus of the first embodiment according to the present invention will be first described with reference to FIG. 1. In FIG. 1, the mold temperature adjusting apparatus 1 comprises a mold 2 having a mold temperature sensor 62 fitted thereto for detecting temperature of the mold 2. Also, the mold 2 has a mold outlet water temperature sensor 65 fitted to a heat medium outlet of the mold 2 for detecting water temperature at the outlet of the mold 2. Further, the mold 2 has a fluid passage formed in the mold 2 or fitted to the mold 2.

Incidentally, as will be described also with respect to the second embodiment, a mold of an injection molding machine is basically constructed such that a fixed mold and a movable mold are closed together to form a mold cavity, a molten resin is injected into the mold cavity from an injection unit and then, after a molded article is cooled to solidify, the fixed mold and movable mold are separated from each other so that the molded article is taken out. However, as the description of the mold temperature adjusting apparatus (means) of FIG. 1 is mainly made on the aspect of the mold temperature adjustment, illustration of the injection unit is omitted in FIG. 1. Also, the mold 2 shown in FIG. 1 represents a mold in the state that the fixed mold and movable mold are closed together.

As shown in FIG. 1, the mold temperature adjusting apparatus (means) 1 is constructed comprising a low temperature water tank (low temperature fluid tank) 3, a high temperature water tank (high temperature fluid tank) 4, a heat recovery tank 5 (15, 25), a low temperature water transfer pump (low temperature fluid transfer pump) 6, a low temperature water transfer pump (low temperature fluid transfer pump) 7 for elevating pressure, a high temperature water transfer pump (high temperature fluid transfer pump) 8 and various pipings and valves connecting these parts and components.

Figure 13:
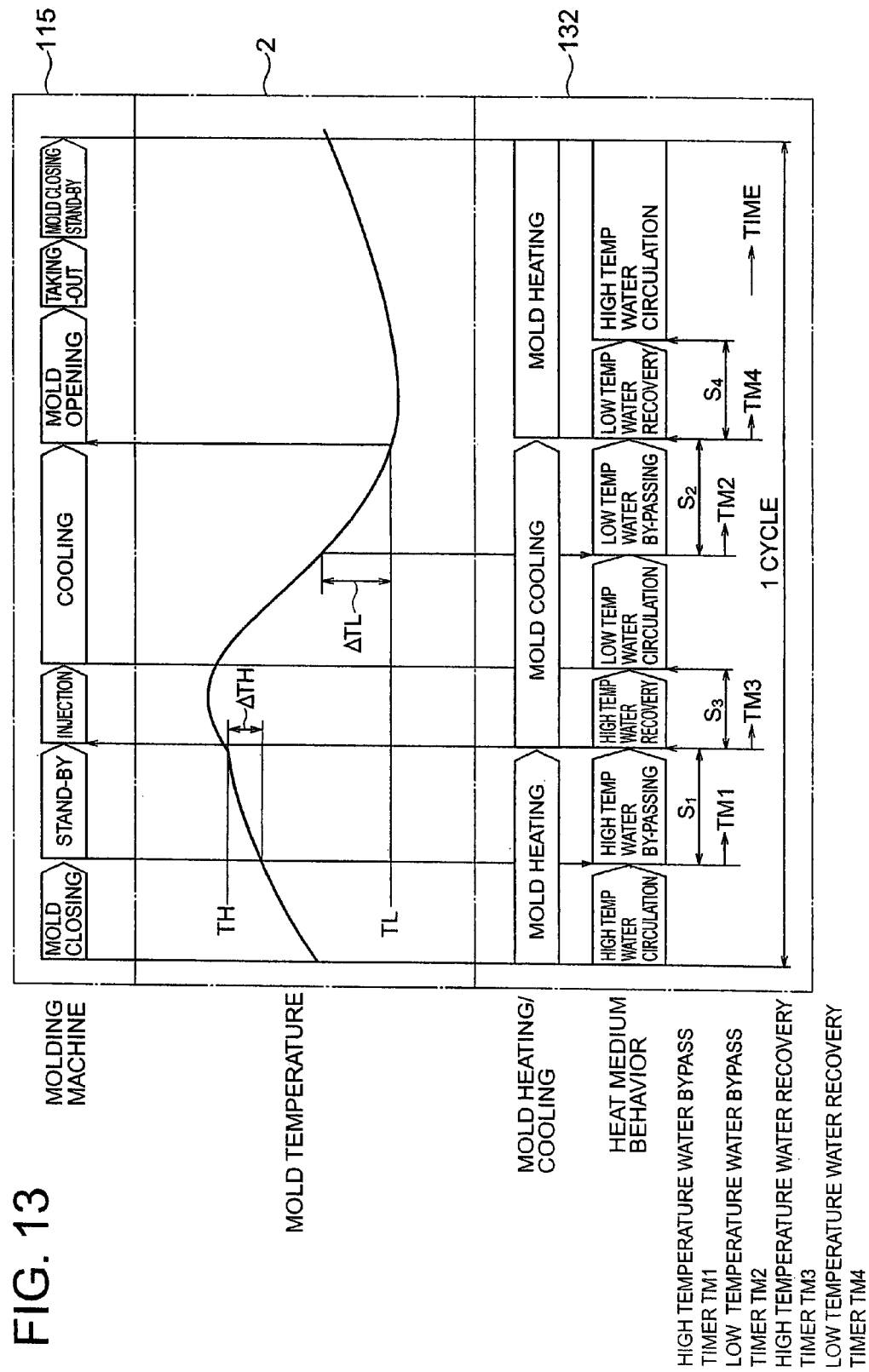
FIG. 13 is a block diagram showing a heat medium behavior and heating/cooling timing represented on a time axis of molding steps while molding is carried out by change-over of mold temperature in the mold temperature adjusting apparatus of the first embodiment mounted on a molding machine.

The mold 2 is controlled by a molding machine control unit 115 to be described with respect to FIG. 13 and the mold temperature adjusting apparatus 1 is controlled by a mold temperature control unit 132 to be likewise described with respect to FIG. 13.

While the low temperature water tank 3 can be constructed in an open type, if the temperature of the high temperature water is to be 100° C. or more, the high temperature water tank 4 and heat recovery tank 5 (15, 25) are constructed to be of a closed pressure type.

It is to be noted that when each of molding steps, described hereinbelow, is changed over from one step to the other, the valves are opened or closed in unison or the valves to be opened are first opened and then the valves to be closed are closed.

In the low temperature water tank 3, in order to adjust the temperature of the low temperature water to a set low temperature, a low temperature water temperature sensor 63 and a low temperature water temperature adjuster (adjusting means) 32 are provided. Thereby, water temperature in the low temperature water tank 3 is detected by the low temperature water temperature sensor 63 provided in the low temperature water tank 3 and flow rate of a cooling medium flowing through the low temperature water temperature adjuster 32 is controlled by the mold temperature control unit 132 of FIG. 13 so that water temperature in the low temperature water tank 3 is maintained to a low temperature water temperature set value TLW.

The low temperature water tank 3 and mold 2 are connected to each other via a low temperature water supply system (low temperature fluid supply system) 31. That is, a low temperature water supply piping 31a at its one end is connected to a lower portion of the low temperature water tank 3. The low temperature water supply piping 31a at the other end is connected to a suction port of the low temperature water transfer pump 6. The low temperature water transfer pump 6 elevates a discharge pressure of the low temperature water to 0.8 MPa and also has a function of a check valve.

A low temperature water supply piping 31b at its one end is connected to a discharge port of the low temperature water transfer pump 6 and at the other end is connected to a suction port of the low temperature water transfer pump 7. The low temperature water transfer pump 7 elevates the discharge pressure of the low temperature water to 1.2 MPa.

A low temperature water supply piping 31c elongates from a discharge port of the low temperature water transfer pump 7 to connect to a low temperature water supply opening/closing valve 52 and a low temperature water supply piping 31d elongates from the low temperature water supply opening/closing valve 52 to connect to a heat medium inlet of the mold 2.

Also, the mold 2 and low temperature water tank 3 are connected to each other via a low temperature water return system (low temperature fluid return system) 35. That is, a low temperature water return piping 35a at its one end is connected to the heat medium outlet of the mold 2 and at the other end is connected to a low temperature water return opening/closing valve 55. A low temperature water return piping 35b elongates from the low temperature water return opening/closing valve 55 to connect to an upper portion of the low temperature water tank 3.

The low temperature water supply piping 31c and low temperature water return piping 35b are connected to each other via a low temperature water by-pass system (low temperature fluid by-pass system) 40. This low temperature water by-pass system 40 comprises a low temperature water by-pass piping 34 and a low temperature water by-pass opening/closing valve 51 interposed in the low temperature water by-pass piping 34.

In the high temperature water tank 4, in order to adjust the temperature of the high temperature water to a set high temperature, a high temperature water temperature sensor 64 and a high temperature water temperature adjuster (adjusting means) 33 are provided. Thereby, water temperature in the high temperature water tank 4 is detected by the high temperature water temperature sensor 64 provided in the high temperature water tank 4 and flow rate of a heating medium flowing through the high temperature water temperature adjuster 33 is controlled by the mold temperature control unit 132 so that water temperature in the high temperature water tank 4 is maintained to a high temperature water temperature set value THW.

The high temperature water tank 4 and mold 2 are connected to each other via a high temperature water supply system (high temperature fluid supply system) 41. That is, a lower portion of the high temperature water tank 4 is connected to a suction port of a high temperature water transfer pump 8. A high temperature water supply piping 41a elongates from a discharge port of the high temperature water transfer pump 8 to connect to a high temperature water supply opening/closing valve 53 and a high temperature water supply piping 41b elongates from the high temperature water supply opening/closing valve 53 to connect to the heat medium inlet of the mold 2.

Also, the mold 2 and high temperature water tank 4 are connected to each other via a high temperature water return system (high temperature fluid return system) 42. That is, a high temperature water return piping 42a at its one end is connected to the heat medium outlet of the mold 2 and at the other end is connected to a high temperature water return opening/closing valve 54. A high temperature water return piping 42b elongates from the high temperature water return opening/closing valve 54 to connect to an upper portion of the high temperature water tank 4.

The high temperature water supply piping 41a and high temperature water return piping 42b are connected to each other via a high temperature water by-pass system (high temperature fluid by-pass system) 43. This high temperature water by-pass system 43 comprises a high temperature water by-pass piping 43a and a high temperature water by-pass opening/closing valve 56 interposed in the high temperature water by-pass piping 43a.

The high temperature water tank 4 and the low temperature water tank 3 are connected to each other via a make-up piping 39 and a manual opening/closing valve 59 interposed in the make-up piping 39. This make-up piping 39 is provided for supplying or making up water into the high temperature water tank 4. It is to be noted that the make-up piping 39 has also a supply pump, etc. interposed therein, although illustration is omitted.

By the construction mentioned above, in a molding step of a resin molded article by an injection molding machine, the low temperature water supply opening/closing valve 52 of the low temperature water supply system 31 and the low temperature water return opening/closing valve 55 of the low temperature water return system 35 are closed and, at the same time, the high temperature water supply opening/closing valve 53 of the high temperature water supply system 41 and the high temperature water return opening/closing valve 54 of the high temperature water return system 42 are opened. Thereby, the high temperature water flows in the heat medium passage of the mold 2 and the mold 2 can be heated.

Reversely to the above, the low temperature water supply opening/closing valve 52 of the low temperature water supply system 31 and the low temperature water return opening/closing valve 55 of the low temperature water return system 35 are opened and, at the same time, the high temperature water supply opening/closing valve 53 of the high temperature water supply system 41 and the high temperature water return opening/closing valve 54 of the high temperature water return system 42 are closed. Thereby, the low temperature water flows in the heat medium passage of the mold 2 and the mold 2 can be cooled.

Also, by closing the low temperature water supply opening/closing valve 52 and low temperature water return opening/closing valve 55 and, at the same time, by opening the low temperature water by-pass opening/closing valve 51 of the low temperature water by-pass system 40, the low temperature water can be circulated without the low temperature water flowing through the mold 2.

Further, by closing the high temperature water supply opening/closing valve 53 and high temperature water return opening/closing valve 54 and, at the same time, by opening the high temperature water by-pass opening/closing valve 56 of the high temperature water by-pass system 43, the high temperature water can be circulated without the high temperature water flowing through the mold 2.

The heat recovery tank 5 (15, 25) is provided between the low temperature water tank 3 and the high temperature water tank 4. The heat recovery tank 5 has a volume larger than the total of a volume of the heat medium passage in the mold 2 and volumes of the high temperature water supply pipings 41a, 41b and high temperature water return pipings 42a, 42b of the high temperature heat medium. The heat recovery tank 5 has its upper portion provided with a high temperature water inlet and its lower portion provided with a low temperature water inlet. Also, the heat recovery tank 5 is a tank of a longitudinally elongated cylindrical shape comprising therein a means suppressing mixing of the high temperature water and low temperature water contained in the tank, as will be described later.

The high temperature water inlet of the heat recovery tank 5 is connected to the high temperature water tank 4 via a transfer piping 44. Also, the low temperature water inlet of the heat recovery tank 5 is connected to the low temperature water supply piping 31b between the low temperature water transfer pump 6 and the low temperature water transfer pump 7 via a feed side piping 36 and an opening/closing pump 57 interposed in the feed side piping 36.

A pressure adjusting system 37 comprises return pipings 37a, 37b. The return piping 37a at its one end is connected to the feed side piping 36 between the opening/closing valve 57 and the heat recovery tank 5 and at the other end is connected with a low temperature water pressure adjusting valve 61. The return piping 37b elongates from a lower portion of the low temperature water tank 3 to connect to the low temperature water pressure adjusting valve 61. An opening/closing valve 58 is interposed in the return piping 37a. The low temperature water pressure adjusting valve 61 functions to constantly maintain water pressure on the heat recovery tank 5 side.

Next, a first example of a concrete construction of the heat recovery tank 5 will be described with reference to FIGS. 2 to 4. As shown in FIGS. 2 and 3, the heat recovery tank 5 is constructed by an upper cover 11, a lower cover 12 and a main body portion between the upper and lower covers 11, 12. The main body portion comprises a central cylinder 5a of a circular cross sectional cylindrical shape and upper and lower cylinder portions 5b, 5c both being integrally formed with the central cylinder 5a and having a diameter slightly larger than that of the central cylinder 5a. It is to be noted that numeral 14 in FIG. 2 designates an air vent screw screwed in the upper cover 11.

In each of the upper and lower cylinder portions 5b, 5c, a multi-hole plate 13 formed in a circular cross sectional cylindrical shape having a diameter approximately the same as that of the central cylinder 5a is provided substantially coaxially with the central cylinder 5a. As shown in FIG. 4, the multi-hole plate 13 has multi-holes 13a, each having a diameter dl, regularly bored therein.

The upper cylinder portion 5b has a water pipe 5d, integrally formed with the upper cylinder portion 5b, through which the high temperature water horizontally flows in or flows out along an inner circumferential surface of the upper cylinder portion 5b. Likewise, the lower cylinder portion 5c has a water pipe 5e, integrally formed with the lower cylinder portion 5c, through which the low temperature water horizontally flows in or flows out along an inner circumferential surface of the lower cylinder portion 5c. The water pipe 5d of the upper cylinder portion 5b is connected to the transfer piping 44. The water pipe 5e of the lower cylinder portion 5c is connected to the feed side piping 36.

A heat insulating material 46 is applied to or coated on an inner surface of the central cylinder 5a. A longitudinal length or height of this heat insulating material 46 is slightly larger than a distance or height h between an upper limit $L_H$ and a lower limit $L_L$ of a boundary surface between the high temperature water and the low temperature water, as will be described later.

Thus, both on the low temperature water side and the high temperature water side, the inlet and outlet of the heat medium water are horizontally provided along the inner circumferential surfaces of the upper and lower cylinder portions 5b, 5c, so that a longitudinal dynamic pressure of the heat medium water at the time when the heat medium water is fed from the respective inlets is reduced. Also, the multi-hole plate 13 is provided in each of the upper and lower cylinder portions 5b, 5c so that a flow resistance of the heat medium water is caused to thereby make a flow velocity of the heat medium water uniform in the heat recovery tank 5. As the result thereof, a convection of the heat medium water in the heat recovery tank 5 is reduced. Hence, in the heat recovery tank 5, the low temperature water and high temperature water are prevented from mixing with each other and the boundary between the low temperature water and the high temperature water can be maintained by the specific gravity difference.

There is known a theoretical equation to ascertain a non-uniformity of the heat medium boundary by the specific gravity difference. That is, where dl is a diameter of the hole 13a of the multi-hole plate 13 and vl is a flow velocity of the heat medium entering the central cylinder 5a through the hole 13a, dimensions of the heat recovery tank 5 are designed so that Ri, given by the following equation, becomes 10 or more:

$$Ri = \Delta\rho \cdot g \cdot dl / (\rho mean \cdot v1^2)$$

Here, g: Gravitational acceleration

Δρ: Density difference between the low temperature medium and the high temperature medium ρ mean: Mean density of the heat medium Ri number is a non-dimensional number representing a ratio of the buoyancy term to the inertia term. The larger is the value of Ri, the more easily tends a thermal stratification to be generated and stabilized. Hence, a heat transmission between the high temperature medium (water) and the low temperature medium (water) due to the irregular flow can be suppressed.

When the high temperature water and low temperature water are to be recovered by using the heat recovery tank 5, the boundary surface between the high temperature water and the low temperature water moves in the distance or height h between the upper limit $L_H$ and the lower limit $L_L$, as shown in FIG. 2. Hence, by multiplying an inner diameter cross sectional area of the central cylinder 5a by the height h, a recovery volume of the high temperature water or low temperature water can be obtained. The heat insulating material 46 has a small thermal capacity and a large heat insulating ability. Hence, the high temperature water is deprived of less heat quantity and the heat loss can be reduced.

A second example of the concrete construction of the heat recovery tank will be described with reference to FIGS. 5 to 7. As shown in FIG. 5, a heat recovery tank 15 is constructed by an upper cover 11, lower cover 12 and tank main body 16 between the upper and lower covers 11, 12. The tank main body 16 comprises a central cylinder 16a of a circular cross sectional cylindrical shape and upper and lower cylinder portions 16b, 16c both being integrally formed with the central cylinder 16a and having a diameter slightly larger than that of the central cylinder 16a. It is to be noted that numeral 14 in FIG. 5 designates an air vent screw screwed in the upper cover 11. Also, the heat recovery tank 15 is not limited to the circular cross sectional cylindrical shape but may be formed in a length-wise elongated cylindrical shape having a polygonal cross section including a square or rectangular cross section.

In each of the upper and lower cylinder portions 16b, 16c, a multi-hole plate 17 formed in a flat disc shape is horizontally fitted to an inner periphery of the respective cylinder portions 16b, 16c. Like the multi-hole plate 13 shown in FIG. 4, the multi-hole plate 17 has multi-holes 17a, each having a diameter dl, regularly bored therein.

The upper cylinder portion 16b has a water pipe 16d, integrally formed with the upper cylinder portion 16b, through which the high temperature water horizontally flows in or flows out along an inner circumferential surface of the upper cylinder portion 16b. Likewise, the lower cylinder portion 16c has a water pipe 16e, integrally formed with the lower cylinder portion 16c, through which the low temperature water horizontally flows in or flows out along an inner circumferential surface of the lower cylinder portion 16c. The water pipe 16d of the upper cylinder portion 16b is connected to the transfer piping 44. The water pipe 16e of the lower cylinder portion 16c is connected to the feed side piping 36.

A plurality of longitudinally elongating flat plate shaped rectifying plates 18 are provided in the central cylinder 16a along an axial direction thereof. These rectifying plates 18 are arranged in parallel to each other with a constant gap being maintained between each of them and have their upper and lower portions supported by support bars 18a fitted to upper and lower portions, respectively, of the central cylinder 16a.

Thus, both on the low temperature water side and high temperature water side, the inlet and outlet of the heat medium water are horizontally provided along the inner circumferential surfaces of the upper and lower cylinder portions 16b, 16c, so that a longitudinal dynamic pressure of the heat medium water at the time when the heat medium water is fed from the respective inlets is reduced. Also, the multi-hole plate 17 is provided between the upper cylinder portion 16b and the central cylinder 16a and between the central cylinder 16a and the lower cylinder portion 16c, respectively, so that a flow resistance of the heat medium water is caused to thereby make a flow velocity of the heat medium water uniform in the heat recovery tank 15. Moreover, the flow of the heat medium water is rectified by the rectifying plates 18. As the result thereof, a convection of the heat medium water in the heat recovery tank 15 is reduced. Hence, in the heat recovery tank 15, the low temperature water and high temperature water are prevented from mixing with each other and the boundary between the low temperature water and the high temperature water can be maintained by the specific gravity difference.

In order to reduce a thermal loss, the rectifying plates 18 are preferably constructed by plates or the like of a heat insulating material having a heat resistant nature.

It is to be noted that, in place of the above-mentioned flat plate shaped rectifying plates 18 provided in the central cylinder 16a, a plurality of corrugated rectifying plates 19, arranged with a constant gap being maintained between each of them and supported by support bars 19a, as shown in FIG. 7, may be used.

A third example of the concrete construction of the heat recovery tank will be described with reference to FIG. 8. In FIG. 8, the parts and components same as those of the second example of the concrete construction of the heat recovery tank are given with the same reference numerals with description thereof being omitted and different points will be described.

In the present third example of the concrete construction of the heat recovery tank, in place of the rectifying plates 18 of the heat recovery tank 15 shown in FIG. 5, a float disc 27 is provided in a central cylinder 16a of a heat recovery tank 25, as shown in FIG. 8. This float disc 27 has a specific gravity of an intermediate value between a specific gravity of the high temperature water and that of the low temperature water so that the float disc 27 floats in the boundary between the high temperature water and the low temperature water. Thereby, the high temperature water and low temperature water are prevented from mixing with each other.

In the heat recovery tank 25, a guide-bar 26 is perpendicularly provided having its one end fixed to a central position of a lower cover 12 of the heat recovery tank 25, so that the float disc 27, having an outer diameter slightly smaller than an inner diameter of the central cylinder 16a, is guided by the guide bar 26 so as to move up and down along the guide bar 26. The float disc 27 is made of a heat insulating material. The float disc 27 has its central portion provided with a guide pipe, having an appropriate length in the perpendicular direction, in which the guide bar 26 is loosely inserted. Numeral 28 designates a rectifier of an arbitrary type.

In the construction mentioned above, if the temperature of the high temperature water is set to 100° C., its specific gravity is about 0.94 and if the temperature of the low temperature water is set to 20° C., its specific gravity is about 1.00. Hence, if the overall specific gravity of the float disc 27 is set to 0.97, when the high temperature water and low temperature water are fed into the upper portion and lower portion, respectively, of the heat recovery tank 25, the float disc 27 floats in the boundary therebetween so as to function as a separating means of the high temperature water and low temperature water from each other.

In place of the float disc 27 made of the heat insulating material, a disc shape bag, made of a soft material and filled with water, can be used. In this case, water temperature in the disc shape bag becomes intermediate between the temperature of the high temperature water and that of the low temperature water and hence the specific gravity of the water in the bag becomes intermediate between the specific gravity of the high temperature water and that of the low temperature water.

Next, function of the mold temperature adjusting apparatus 1 and control contents of the molding machine control unit 115 and mold temperature control unit 132 will be described with reference to FIGS. 9 to 13.

Figure 9:
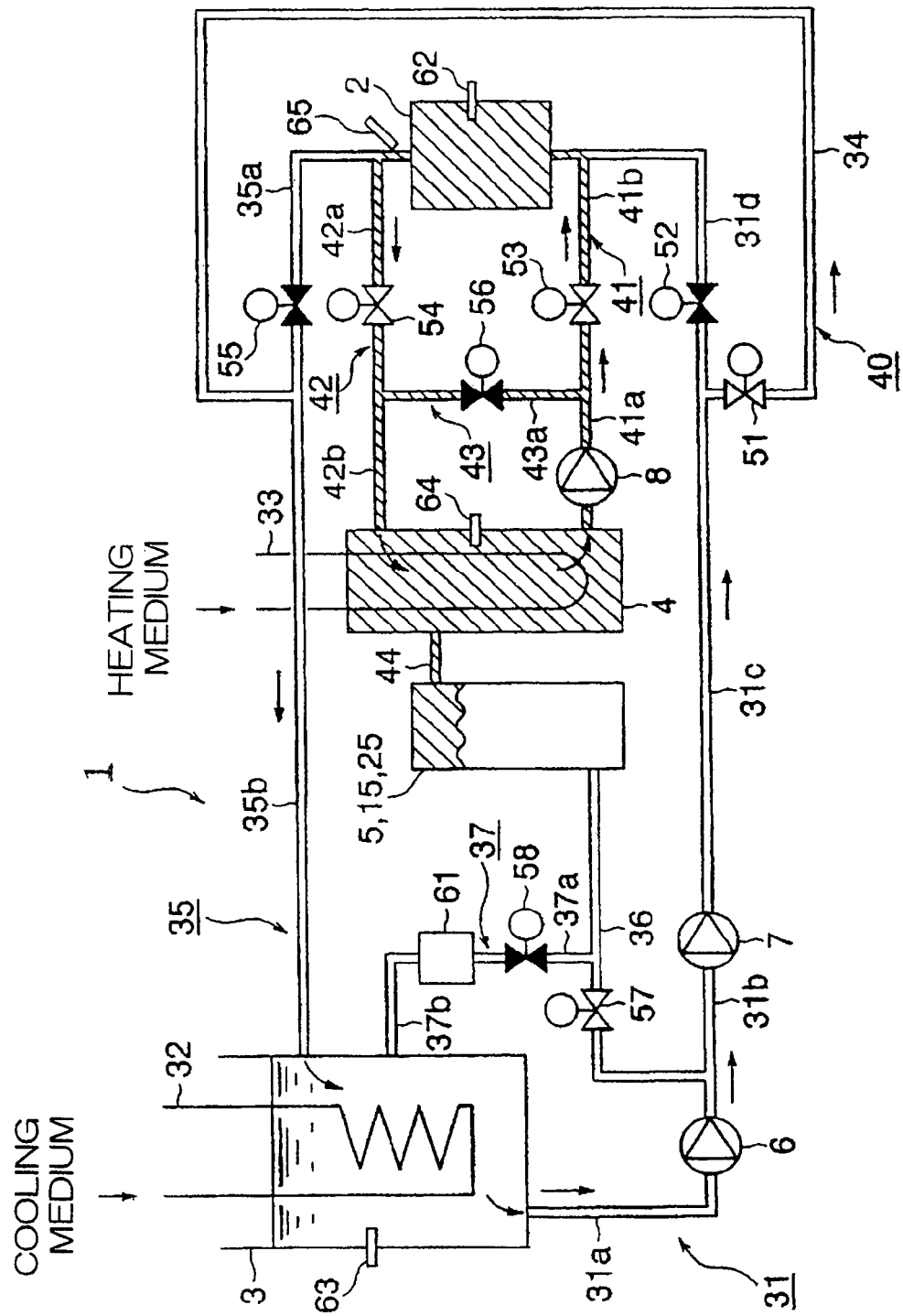
FIG. 9 is a view showing a circulation flow of high temperature water in a mold heating step of the mold temperature adjusting apparatus of the first embodiment.
Figure 10:
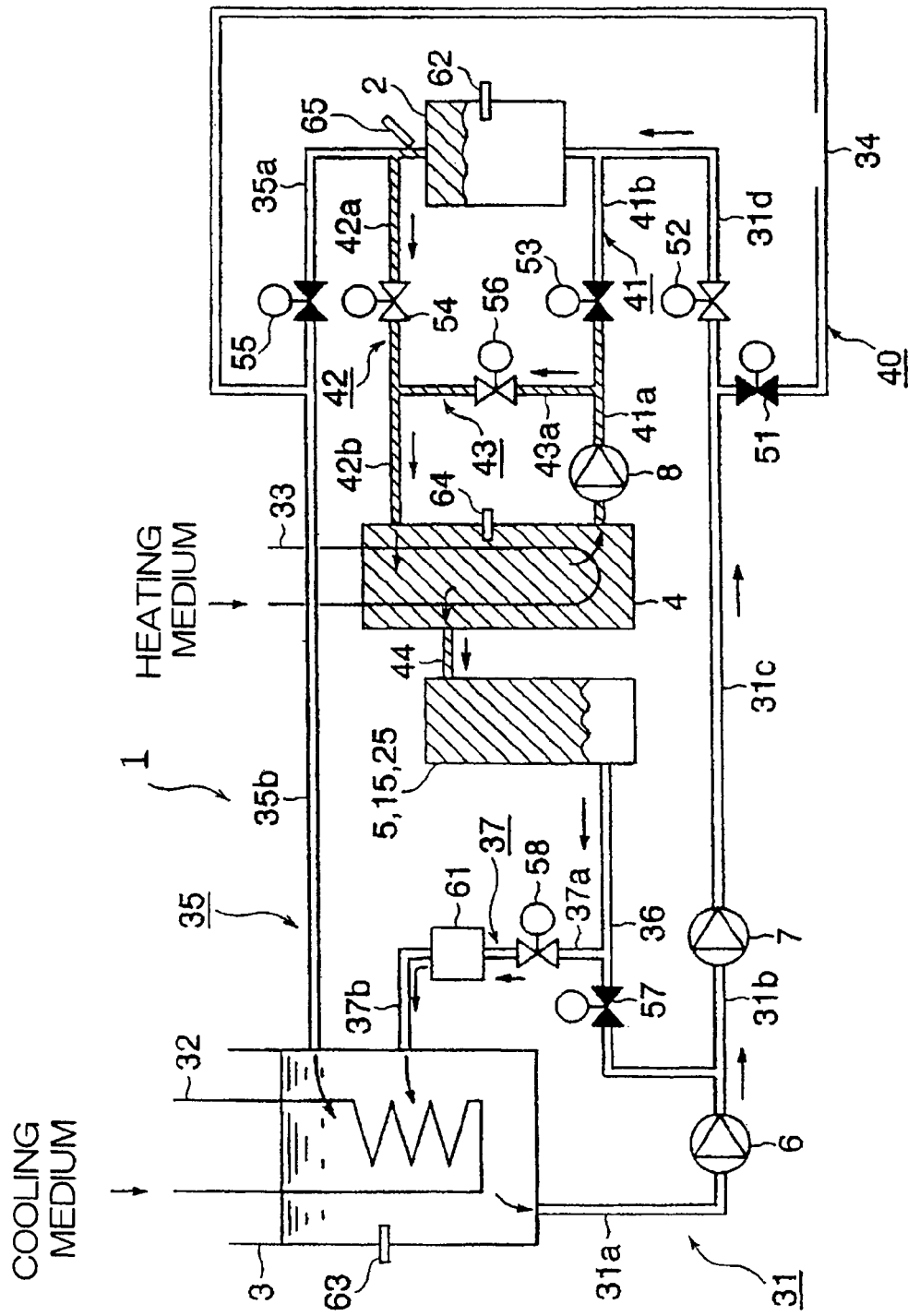
FIG. 10 is a view showing flows of high temperature water and low temperature water in a high temperature water/low temperature water change-over high temperature water recovery step of the mold temperature adjusting apparatus of the first embodiment.
Figure 11:
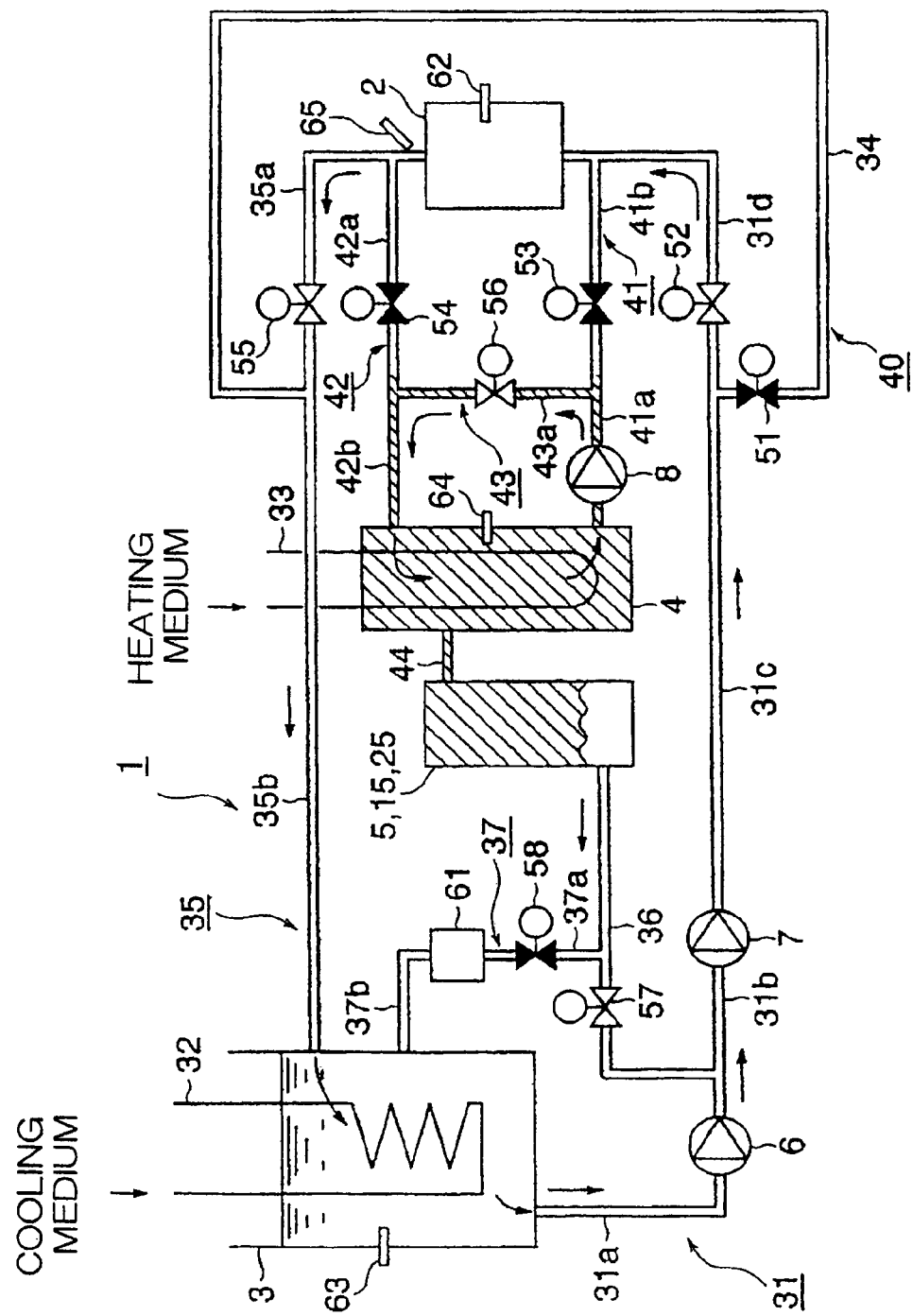
FIG. 11 is a view showing a circulation flow of low temperature water in a mold cooling step of the mold temperature adjusting apparatus of the first embodiment.
Figure 12:
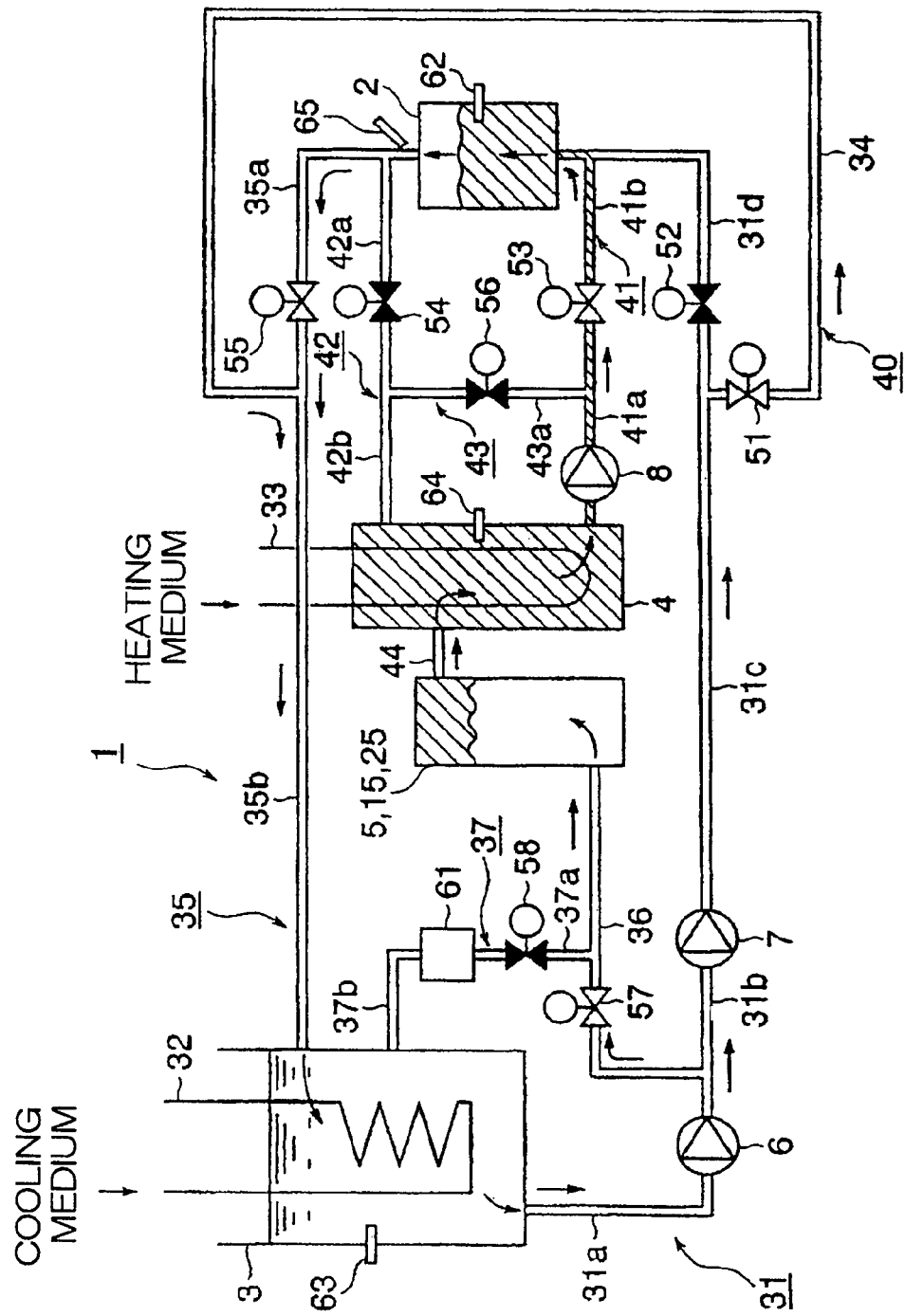
FIG. 12 is a view showing flows of high temperature water and low temperature water in a low temperature water/high temperature water change-over low temperature water recovery step of the mold temperature adjusting apparatus of the first embodiment.

FIG. 9 is a view showing a circulation flow of the high temperature water in a mold heating step of the mold temperature adjusting apparatus of the present first embodiment. FIG. 10 is a view showing flows of the high temperature water and low temperature water in a high temperature water/low temperature water change-over high temperature water recovery step. FIG. 11 is a view showing a circulation flow of the low temperature water in a mold cooling step. FIG. 12 is a view showing flows of the high temperature water and low temperature water in a low temperature water/high temperature water change-over low temperature water recovery step.

FIG. 13 is a block diagram showing a heat medium behavior and heating/cooling timing represented on a time axis of molding steps while molding is carried out by change-over of temperature of the mold 2 in the mold temperature adjusting apparatus of the present first embodiment mounted on a molding machine. That is, in FIG. 13, the top portion thereof shows control contents of the molding machine control unit 115, a curved line of the upper mid portion shows a changing state of temperature and a lower portion shows control contents of the mold temperature control unit 132.

As shown in FIG. 13, in injection molding steps to heat the mold 2 before filling a molten resin and to cool the mold 2 after filling the molten resin in an injection molding machine, the mold 2 is heated or cooled in a high temperature water circulation (mold heating) step, a low temperature water circulation (molding cooling) step, a high temperature water recovery (mold cooling) step and a low temperature water recovery (mold heating) step, all to be described later.

In the mold temperature control unit 132, there are previously set a heating over-shooting temperature correction value ΔTH at the time when the mold 2 is to be heated, a cooling under-shooting temperature correction value ΔTL at the time when the mold 2 is to be cooled, a resin filling start mold temperature TH of the high temperature mold 2 at the time when a filling step is to be started, a cooling finish temperature (hereinafter sometimes referred to as "a mold opening start temperature") TL, an over-shooting time (hereinafter sometimes referred to as "a high temperature water by-passing action set time") S1, an under-shooting time (hereinafter sometimes referred to as "a low temperature water by-passing action set time") S2, a feed time (hereinafter sometimes referred to as "a high temperature water recovery time set value") S3 and a feed time (hereinafter sometimes referred to as "a low temperature water recovery time set value") S4.

Here, as a heat transmission velocity is slow when a member having a large thermal capacity, like the mold 2, is heated, the heating over-shooting temperature correction value $\Delta TH$ at the heating time means a set value (correction value) of temperature that is still elevated even if feed of the heat medium is stopped at the set temperature. Reversely, the cooling under-shooting temperature correction value $\Delta TL$ at the cooling time means a set value (correction value) of temperature that is still lowered even if feed of the cooling medium is stopped at the set temperature.

It is to be noted that while a recovery of the low temperature water in the second and third embodiments, to be described later, is started before the mold opening start temperature TL is realized, the recovery of the low temperature water in the present first embodiment is started after the mold opening start temperature TL has been realized. Thereafter, a high temperature fluid stop temperature $TH-\Delta TH$ is calculated by subtracting the heating over-shooting temperature correction value $\Delta TH$ from the resin filling start mold temperature TH and a low temperature fluid stop temperature $TL+\Delta TL$ is calculated by adding the cooling under-shooting temperature correction value $\Delta TL$ to the mold opening start temperature TL.

(1-1) High Temperature Water Circulation Step as Part of the Mold Heating Step

In the high temperature water circulation step as a middle part of the mold heating step shown in FIG. 13, the mold temperature control unit 132 performs a control such that, as shown in FIG. 9, the low temperature water supply opening/closing valve 52 of the low temperature water supply system 31 and the low temperature water return opening/closing valve 55 of the low temperature water return system 35 are closed and the low temperature water by-pass opening/closing valve 51 of the low temperature water by-pass system 40 is opened.

Further, on the high temperature water side, the high temperature water by-pass opening/closing valve 56 of the high temperature water by-pass system 43 is closed and the high temperature water supply opening/closing valve 53 of the high temperature water supply system 41 and the high temperature water return opening/closing valve 54 of the high temperature water return system 42 are opened.

The low temperature water transfer pump 6, the low temperature water transfer pump 7 for elevating pressure and the high temperature water transfer pump 8 are continuously operated throughout the high temperature water circulation step and subsequent steps thereof.

By the operation mentioned above, flow of the low temperature water is returned into the low temperature water tank 3 via the low temperature water by-pass piping 34 without being supplied into the mold 2.

On the other hand, by the high temperature water transfer pump 8, the high temperature water is supplied into the mold 2 via the high temperature water supply system 41 and is returned through the high temperature water return system 42 and thereby the mold 2 is heated.

While the mold 2 is being so heated, the mold 2 is closed by the molding machine control unit 115 on the injection molding machine side, as shown in FIG. 13.

By the high temperature water being supplied into the mold 2, quantity of the high temperature water in the high temperature water tank 4 is reduced. On the other hand, the opening/closing valve 57 interposed in the feed side piping 36 is opened and the opening/closing valve 58 interposed in the pressure adjusting system 37 is closed.

Thus, corresponding to the reduced quantity of the high temperature water, the low temperature water transfer pump 6 is operated so that the low temperature water is supplied into the lower portion of the heat recovery tank 5 via the feed side piping 36 and the high temperature water in the upper portion of the heat recovery tank 5 is transferred into the high temperature water tank 4 via the transfer piping 44.

(1-2) High Temperature Water By-Passing Step as Part of the Mold Heating Step

In the high temperature water by-passing step as a latter part of the mold heating step shown in FIG. 13, when a mold temperature T detected by the mold temperature sensor 62 reaches the high temperature fluid stop temperature $TH-\Delta TH$, the high temperature water supply opening/closing valve 53 of the high temperature water supply system 41 and the high temperature water return opening/closing valve 54 of the high temperature water return system 42 are closed to thereby stop the high temperature water to be supplied into the mold 2. Also, the high temperature water by-pass opening/closing valve 56 is opened to thereby cause the high temperature water to by-pass through the high temperature water by-pass system 43. Thus, the high temperature water returns into the high temperature water tank 4.

Also, the low temperature water returns into the low temperature water tank 3 via the low temperature water by-pass system 40.

In the meanwhile, the injection molding machine side is on a stand-by state for injection and filling, as shown in FIG. 13.

(2-1) High Temperature Water Recovery Step as Part of the Mold Cooling Step

When a high temperature water by-pass timer TM1 in the mold temperature control unit 132 judges that the high temperature water by-passing action set time S1 has passed, in the high temperature water recovery step as a former part of the mold cooling step shown in FIG. 13, the high temperature water return opening/closing valve 54 of the high temperature water return system 42 is closed, as shown in FIG. 10. At the same time, the low temperature water by-pass opening/closing valve 51 of the low temperature water by-pass system 40 is closed and the low temperature water supply opening/closing valve 52 of the low temperature water supply system 31 is opened.

By the operation mentioned above, the low temperature water is supplied into the heat medium water passage of the mold 2 and thereby the high temperature water remaining in the mold 2 and surrounding pipings thereof is pushed out to flow through the high temperature water return system 42 and is recovered into the high temperature water tank 4 and further into the heat recovery tank 5.

The high temperature water entering the upper portion of the heat recovery tank 5 from the high temperature water tank 4 is prevented from mixing with the low temperature water by a means suppressing mixing of the high temperature water and low temperature water, such as by a gravity separation, and is stored in the upper portion of the heat recovery tank 5.

At this time, the opening/closing valve 57 interposed in the feed side piping 36 is closed and the opening/closing valve 58 interposed in the pressure adjusting system 37 is opened. Thus, when the total quantity of the high temperature water and low temperature water in the heat recovery tank 5 exceeds a capacity of the heat recovery tank 5, the low temperature water in the lower portion of the heat recovery tank 5 flows out to be fed into the low temperature water tank 3 via the feed side piping 36 and pressure adjusting system 37.

The high temperature water recovery time set value S3 can be previously obtained from the relation between a recovery quantity of the high temperature water (high temperature water remaining quantity) remaining in the mold 2 and surrounding pipings thereof and a feed quantity of the low temperature water transfer pump 7.

When a high temperature water recovery timer TM3 in the mold temperature control unit 132 judges that the high temperature water recovery time set value S3 has passed, the high temperature water return opening/closing valve 54 of the high temperature water return system 42 is closed to thereby finish the recovery of the high temperature water and, at the same time, the low temperature water return opening/closing valve 55 is opened, as will be described later.

It is to be noted that in place of setting and using the high temperature water recovery time set value S3, a change-over temperature of the heat medium water temperature at the heat medium water outlet of the mold 2 is set in the mold temperature control unit 132 and when the temperature detected by the mold outlet water temperature sensor 65 exceeds this set value, the high temperature water return opening/closing valve 54 may be operated to be closed.

While the high temperature water return opening/closing valve 54 is so closed, the high temperature water returns into the high temperature water tank 4 via the high temperature water by-pass system 43.

Also, on the injection molding machine side, when the detected mold temperature T reaches the resin filling start mold temperature TH, an injection and filling step is started, as shown in FIG. 13.

(2-2) Low Temperature Water Circulation Step as Part of the Mold Cooling Step

In the low temperature water circulation step as a middle part of the mold cooling step shown in FIG. 13, after the high temperature water has been recovered into the heat recovery tank 5 from the mold 2, the low temperature water return opening/closing valve 55 of the low temperature water return system 35 is opened, as shown in FIG. 11. By this operation, the low temperature water is supplied into the mold 2 so that the mold cooling step of the mold 2 is continued.

On the high temperature water side, the high temperature water supply opening/closing valve 53 of the high temperature water supply system 41 and the high temperature water return opening/closing valve 54 of the high temperature water return system 42 are closed. Also, the high temperature water by-pass opening/closing valve 56 is opened. Thereby, the supply of the high temperature water into the mold 2 is stopped and the high temperature water is caused to by-pass through the high temperature water by-pass system 43. Thus, the high temperature water is circulated between the high temperature water by-pass system 43 and the high temperature water tank 4.

At this time, the opening/closing valve 57 interposed in the feed side piping 36 is opened and the opening/closing valve 58 interposed in the pressure adjusting system 37 is closed. Thus, pressure in the heat recovery tank 5 and high temperature water tank 4 is elevated by the low temperature water transfer pump 6.

On the injection molding machine side, an injected resin pressure maintaining and mold cooling step is commenced.

(2-3) Low Temperature Water By-Passing Step as Part of the Mold Cooling Step

In the low temperature water by-passing step as a latter part of the mold cooling step shown in FIG. 13, when the detected mold temperature T reaches the low temperature fluid stop temperature TL+ΔTL, the low temperature water by-pass opening/closing valve 51 of the low temperature water by-pass system 40 is opened and the low temperature water supply opening/closing valve 52 of the low temperature water supply system 31 and the low temperature water return opening/closing valve 55 of the low temperature water return system 35 are closed.

By this operation, the supply of the low temperature water into the mold 2 is stopped and the low temperature water returns into the low temperature water tank 3 via the low temperature water by-pass system 40 and low temperature water return system 35.

(3-1) Low Temperature Water Recovery Step as Part of the Mold Heating Step

When a low temperature water by-pass timer TM2 in the mold temperature control unit 132 judges that the low temperature water by-passing action set time S2 has passed, in the low temperature water recovery step as a former part of the mold heating step shown in FIG. 13, the low temperature water return opening/closing valve 55 of the low temperature water return system 35 is opened, as shown in FIG. 12. At the same time, the high temperature water by-pass opening/closing valve 56 of the high temperature water by-pass system 43 is closed and the high temperature water supply opening/closing valve 53 of the high temperature water supply system 41 is opened.

The low temperature water is fed into the lower portion of the heat recovery tank 5 by hydraulic pressure given by the low temperature water transfer pump 6 to be replaced with the high temperature water there. Thereby, the high temperature water in the upper portion of the heat recovery tank 5 is fed into the high temperature water tank 4 and the low temperature water remaining in the mold 2 and surrounding pipings thereof is recovered into the low temperature water tank 3.

The low temperature water recovery time set value S4 can be previously obtained from the relation between a recovery quantity of the low temperature water (low temperature water remaining quantity) remaining in the mold 2 and surrounding pipings thereof and a feed quantity of the high temperature water transfer pump 8.

When a low temperature water recovery timer TM4 in the mold temperature control unit 132 judges that the low temperature water recovery time set value S4 has passed, the high temperature water return opening/closing valve 54 is opened and the low temperature water return opening/closing valve 55 of the low temperature water return system 35 is closed to thereby finish the recovery of the low temperature water.

It is to be noted that in place of setting and using the low temperature water recovery time set value S4, a change-over temperature of the heat medium water temperature at the heat medium water outlet of the mold 2 is set in the mold temperature control unit 132 and when the temperature detected by the mold outlet water temperature sensor 65 exceeds this set value, the high temperature water return opening/closing valve 54 may be operated to be opened and the low temperature water return opening/closing valve 55 may be operated to be closed.

(3-2) High Temperature Water Circulation Step as Part of the Mold Heating Step

After the low temperature water recovery time set value S4 detected by the low temperature water recovery timer TM4 has passed, in the high temperature water circulation step as a middle part of the mold heating step shown in FIG. 13, the low temperature water return opening/closing valve 55 of the low temperature water return system 35 is kept closed and the high temperature water return opening/closing valve 54 of the high temperature water return system 42 is kept opened. Thus, after the low temperature water is recovered to be replaced with the high temperature water, the low temperature water is circulated through the by-pass passage and the high temperature water is continuously supplied into the mold 2 so that the high temperature water circulation step in the mold heating step, as mentioned above, is again commenced.

On the injection molding machine side, when the detected mold temperature T reaches the mold opening start temperature TL, the mold cooling step of the mold 2 is completed. Then, the mold 2 is opened so that the molded article is taken out. Subsequently, a mold closing stand-by step and the above-mentioned mold closing step are carried out.

As mentioned above, in the high temperature water recovery step in the mold temperature adjusting step, the high temperature water in the mold 2 and surrounding pipings thereof is recovered into the high temperature water tank 4 or into the heat recovery tank 5 by the low temperature water in the low temperature water supply system 31.

Further, in the low temperature water recovery step, the low temperature water in the mold 2 and surrounding pipings thereof is recovered into the low temperature water tank 3 by the high temperature water in the high temperature water supply system 41.

At this time, the heat recovery tank 5 functions as a buffer of the high temperature water tank 4 so that the high temperature water overflowing the high temperature water tank 4 is primarily stored in the upper portion of the heat recovery tank 5.

Thus, as the high temperature water is in no case discharged outside, heat loss can be suppressed to the minimum. Also, as the low temperature water transfer pump 6, low temperature water transfer pump 7 for elevating pressure and high temperature water transfer pump 8 are continuously operated, mechanical and electrical shocks caused by starts and stops become less and the endurability is enhanced.

In the above-mentioned mold temperature adjusting step, by continuously operating the low temperature water transfer pump 6 and by adjusting the low temperature water pressure adjusting valve 61 provided in the pressure adjusting system 37 connected to the low temperature water tank 3, interior of the high temperature water piping system is maintained in a higher pressure so that a vaporizing temperature of the high temperature water is elevated and the mold 2 can be controlled in a higher temperature.

In the injection step of the injection molding machine, if the temperature of the mold 2 is low, there is a risk in the conventional machine that the molten resin making contact with the mold 2 quickly solidifies before the pressure of the injected molten resin is sufficiently elevated so that the surface of the molded article becomes coarse to thereby make a transfer of a cavity face of the mold 2 insufficient. But according to the mold temperature adjusting apparatus of the present embodiment, the temperature of the mold 2 is maintained higher at the time of injection and filling so that solidification of the surface of the molten resin, after filled, is delayed and then the mold 2 is forcibly cooled. Thus, the cycle of the injection step can be shortened.

Actual Example

The temperature adjustment according to the present invention is carried out using ABS resin under the condition of the high temperature water temperature of 150° C. and the low temperature water temperature of 20° C., wherein the resin filling start mold temperature TH is set to 120° C., the heating over-shooting temperature correction value ΔTH to 15° C., the mold opening start temperature TL to 70° C. and the cooling under-shooting temperature correction value ΔTL to 20° C.

The result obtained shows that there is caused no substantial over-shooting of the temperature to thereby shorten the molding cycle to 50 seconds from 70 seconds and the surface deterioration of the molded article is solved to thereby enhance the transfer ability.

Second Embodiment

Next, a mold temperature adjusting apparatus of a second embodiment according to the present invention will be described with reference to FIGS. 14 to 17. Also, a mold temperature adjusting method with respect to this second embodiment will be described.

In the present second embodiment, as compared with the first embodiment as described above, there are provided neither the low temperature water by-pass system 40 nor the high temperature water by-pass system 43, but the heat medium is likewise controlled such that opening and closing of each of the valves are effected as well as start and stop of the high temperature water transfer pump 8 are carried out. Nevertheless, the construction may also be made such that the low temperature water by-pass system 40 and the high temperature water by-pass system 43 are provided being connected to the mold temperature adjusting apparatus, like in the first embodiment, to thereby control the flow of the heat medium by opening and closing each of the valves.

Figure 14:
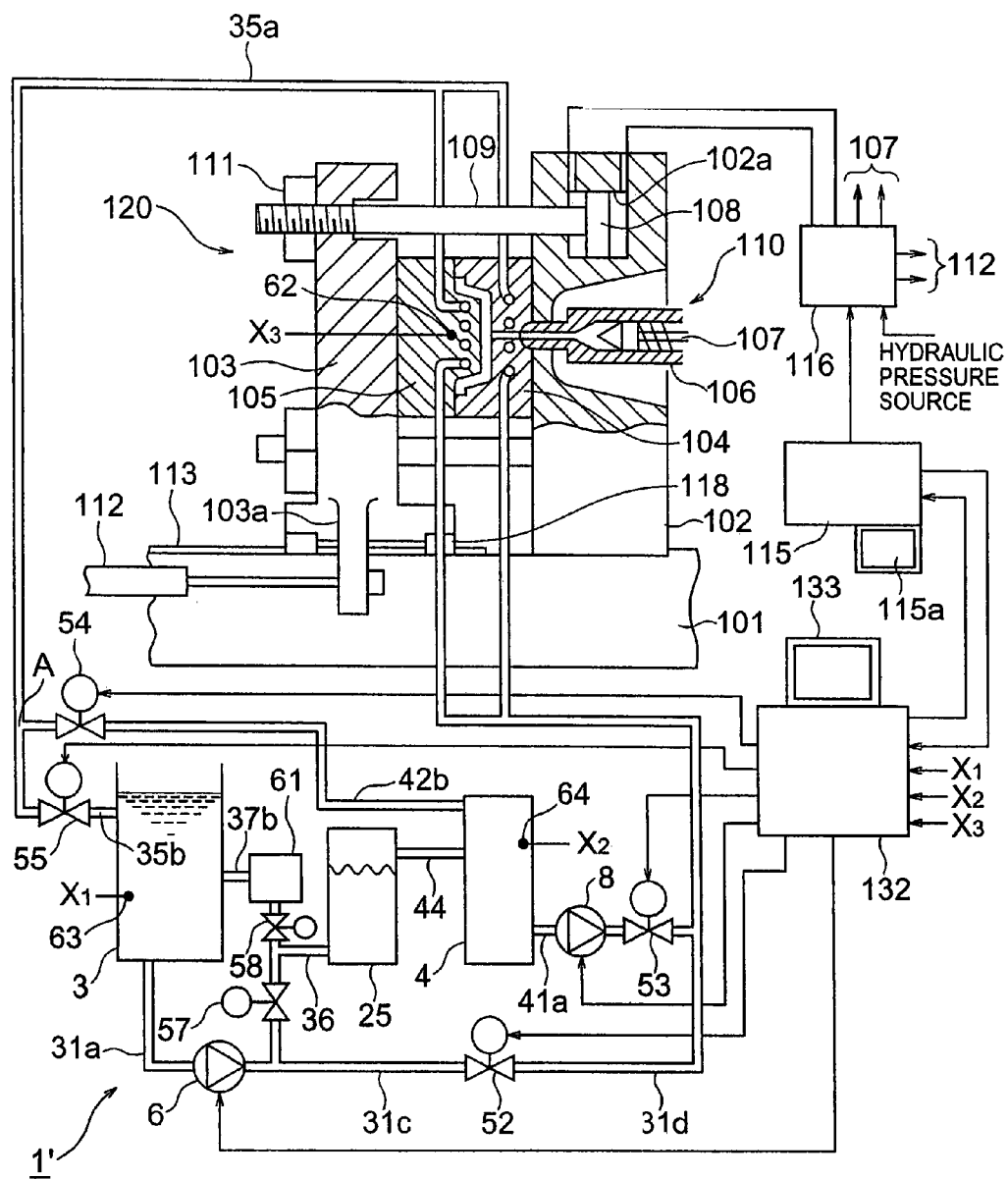
FIG. 14 is a schematic piping diagram of a mold temperature adjusting apparatus of a molding machine of a second embodiment according to the present invention, including a cross sectional view of a mold portion of an injection molding machine.

Further, as compared with the first embodiment, a hydraulic pressure change-over valve 116, a molding machine control unit 115 and a mold temperature control unit 112 are illustrated in FIG. 14 being connected to the mold temperature adjusting apparatus 1' of the present second embodiment.

Figure 15:
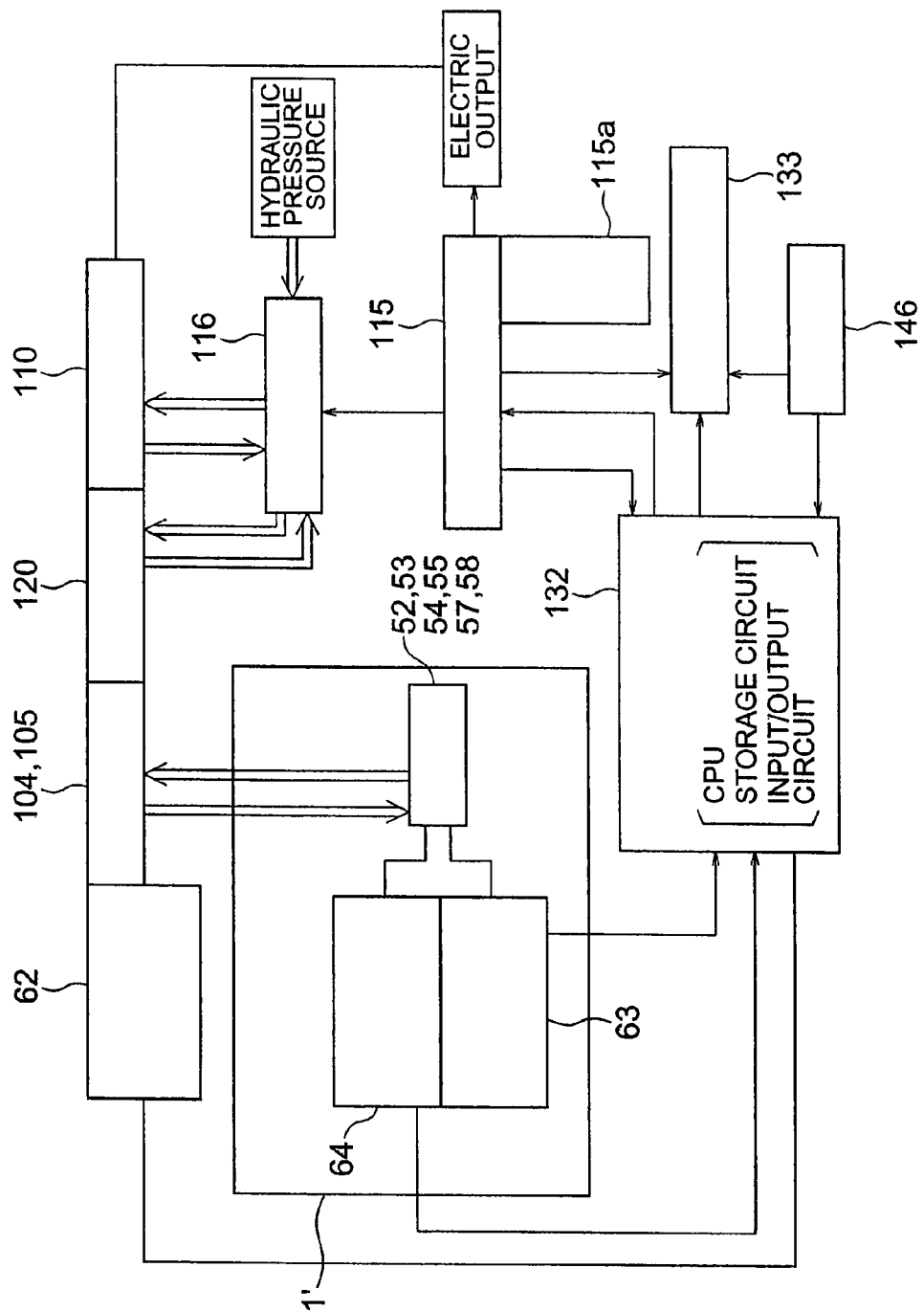
FIG. 15 is a block diagram showing a temperature adjusting control system of the mold temperature adjusting apparatus of the second embodiment of FIG. 14.
Figure 16:
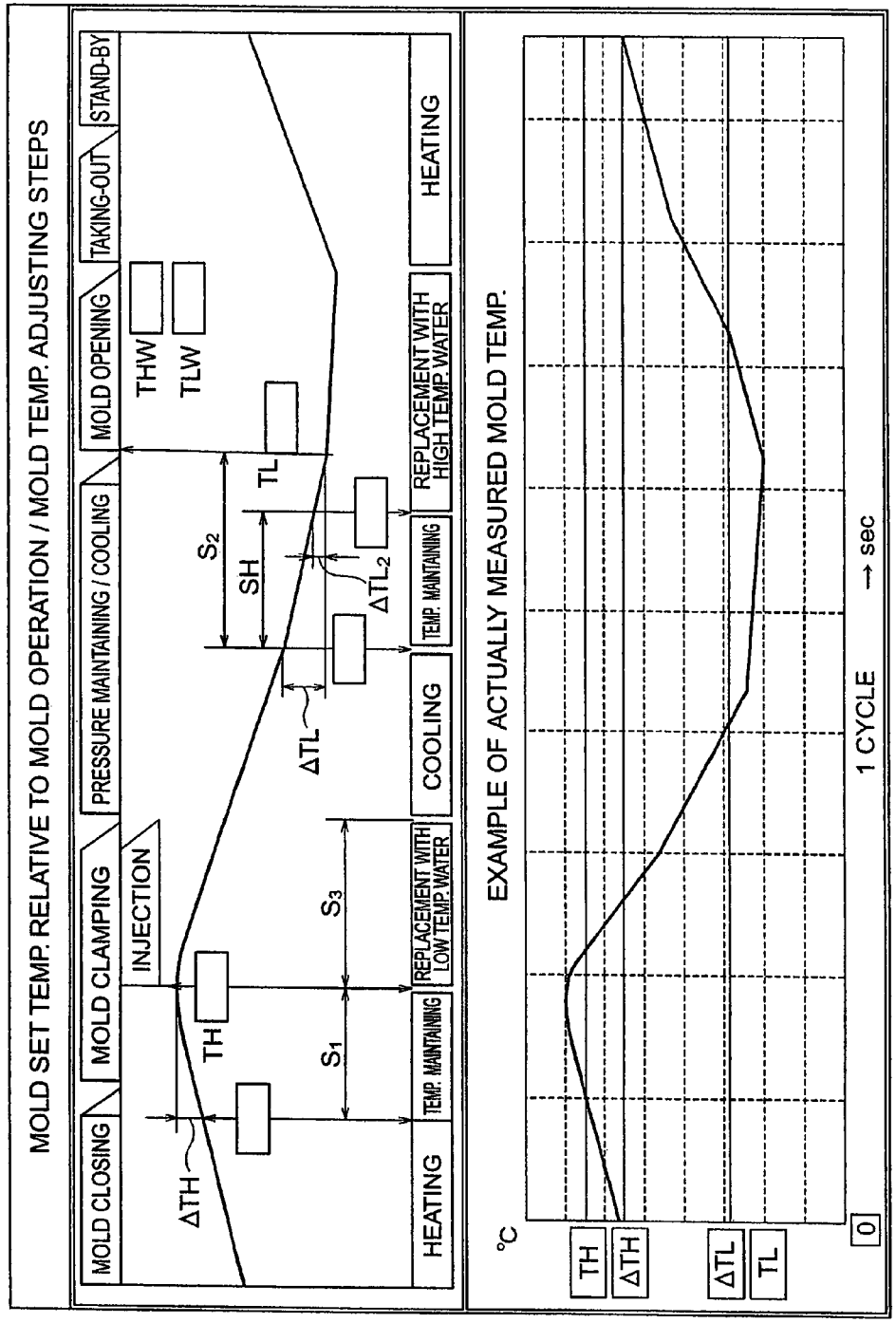
FIG. 16 is a view showing one example of an image having writing-in frames of mold temperature set values and actually measured mold values for each of operating steps of the injection molding machine.
Figure 17:
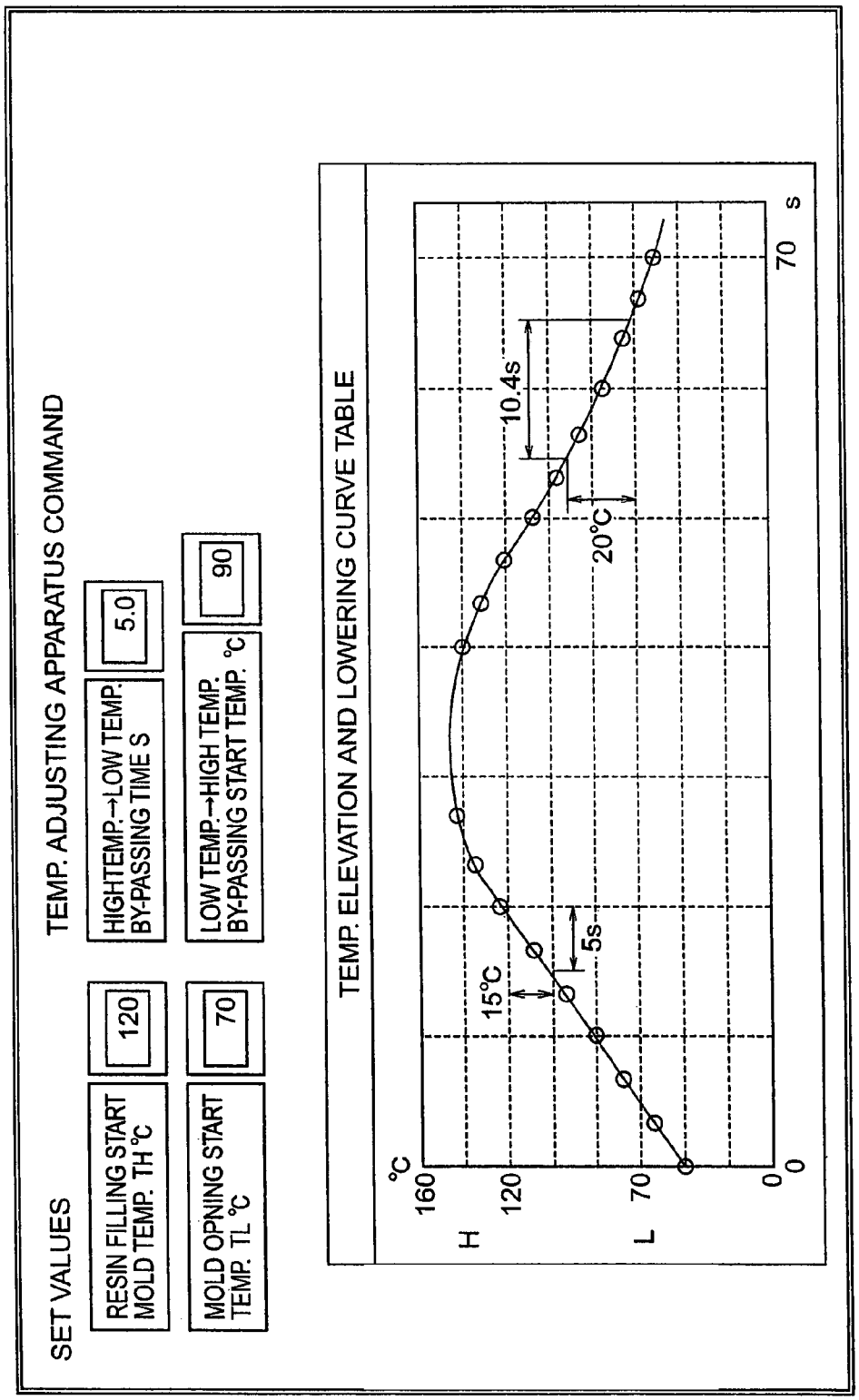
FIG. 17 is a view showing one example of an image having an actually measured wave shape of mold temperature changes when the mold is heated and cooled by the mold temperature adjusting apparatus of the second embodiment.

FIG. 14 is a schematic piping diagram of, including a cross sectional view of a mold portion of an injection molding machine. FIG. 15 is a block diagram showing a temperature adjusting control system of the mold temperature adjusting apparatus of FIG. 14. FIG. 16 is a view showing one example of an image having writing-in frames of mold temperature set values and actually measured mold values for each of operating steps of the injection molding machine. FIG. 17 is a view showing one example of an image having an actually measured wave shape of mold temperature changes when the mold is heated and cooled by the mold temperature adjusting apparatus of FIG. 14.

Herebelow, additionally to the description of the mold temperature adjusting apparatus of the first embodiment, a construction of a mold closing apparatus 120 of the injection molding machine will be described with reference to FIG. 14. The parts and components substantially the same as those of the first embodiment are designated with the same reference numerals and description thereof will be omitted.

The mold closing apparatus 120 comprises a fixed die plate 102 fixedly supported to a base 101 and a movable die plate 103 opposedly provided to this fixed die plate 102. The movable die plate 103 is supported on a guide rail 113 provided on the base 101 so as to be movable to and from the fixed die plate 102 via linear bearings 118. For movement of the movable die plate 103, a die plate moving hydraulic cylinder 112 effecting a hydraulic power drive is used as one example. The fixed die plate 102 has its surface opposing the movable die plate 103 fitted with a fixed mold 104 and the movable die plate 103 has its surface opposing the fixed die plate 102 fitted with a movable mold 105. The fixed mold 104 and movable mold 105 constitute the mold 2. Thus, by the movement of the movable die plate 103 driven by the die plate moving hydraulic cylinder 112, opening and closing of the fixed mold 104 and movable mold 105, or the mold 2, are effected.

In the fixed die plate 102, a plurality of mold closing hydraulic cylinders 102a are provided. These mold closing hydraulic cylinders 102a are provided in four corner portions of the fixed die plate 102, for example.

A ram 108 is slidably arranged in each of the mold closing hydraulic cylinders 102a and a tie bar 109, having its distal end portion threaded, is connected to the ram 108. The distal end portion of the tie bar 109 passes through the movable die plate 103 and is connected, via a thread engagement, with half nuts 111 provided on the movable die plate 103 on the reverse side of the mold opposing the fixed die plate 102. Thereby, the tie bar 109 can move together with the movable die plate 103.

There is provided a hydraulic power change-over valve 116 controlled by a command given from the molding machine control unit 115 so that a drive hydraulic power of the mold closing hydraulic cylinders 102a, an injection screw 107 and the like is changed over. The molding machine control unit 115 comprises a setting and displaying means 115a having an image displaying panel of touch key type. By this setting and displaying means 115a, set values of the molding conditions of the molding machine, such as an injection pressure and the like, are set as well as actually measured values of the injection pressure and the like are displayed by an image of wave shape or the like.

An injection unit 110 is provided comprising an injection cylinder 106, the injection screw 107 and the like so that a molten resin is injected into a mold cavity formed in the mold when the fixed mold 104 and movable mold 105 are closed and clamped together. The injection cylinder 106 comprises a nozzle that abuts on a resin inlet of the fixed mold 104 during the injection operation. The injection screw 107 is rotationally driven by a drive mechanism (not shown) for plasticization of the resin as well as is forwardly and backwardly driven by a drive mechanism (not shown) for injection of the molten resin.

The mold is released from the mold clamped state in which the movable mold 105 and fixed mold 104 are closed and clamped together, when a molded article in the mold cavity is cooled and solidified. Then, by the action of the die plate moving hydraulic cylinder 112, the movable mold 105 is separated from the fixed mold 104 and the molded article is taken out.

The movable mold 105 is fitted with a mold temperature sensor 62. Or the mold temperature sensor 62 may be fitted to the fixed mold 104 or may be fitted to both of the movable mold 105 and the fixed mold 104.

Next, the mold temperature adjusting apparatus 1' will be described.

Like in the first embodiment, a low temperature water tank 3 comprises a low temperature water temperature adjusting means (not shown) adjusting the temperature of the low temperature water to a set low temperature. A low temperature water supply piping 31a elongates from a bottom portion of the low temperature water tank 3 to be connected to heat medium inlets of the fixed mold 104 and movable mold 105 via a low temperature water transfer pump 6, a low temperature water supply piping 31c, a low temperature water supply opening/closing valve 52 and a low temperature water supply piping 31d.

On the other hand, a low temperature water return piping 35a elongates from an upper portion of the low temperature water tank 3 to be connected to heat medium outlets of the fixed mold 104 and movable mold 105 via a low temperature water return opening/closing valve 55 and a low temperature water return piping 35c.

A low temperature water temperature sensor 63 is provided on the low temperature water tank 3 for detecting temperature of the low temperature water as a heat medium in the low temperature water tank 3. Output of this low temperature water temperature sensor 63 is used for a control to maintain the temperature of the low temperature water in the low temperature water tank 3 to the above-mentioned set low temperature, more concretely, for a control of quantity of a cooling medium flowing through the low temperature water temperature adjusting means of the low temperature water tank 3.

A high temperature water tank 4 comprises a high temperature water temperature adjusting means (not shown) adjusting the temperature of the high temperature water to a set high temperature. A high temperature water supply piping 41a elongates from a lower portion of the high temperature water tank 4 to be connected to the low temperature water supply pump 31d via a high temperature water transfer pump 8 circulating the high temperature water and a high temperature water supply opening/closing valve 53.

Also, a high temperature water return piping 42b elongates from an upper portion of the high temperature water tank 4 to be connected at a return piping jointing portion A to the high temperature water return piping 35 via a high temperature water return opening/closing valve 54.

A high temperature water temperature sensor 64 is provided on the high temperature water tank 4 for detecting temperature of the high temperature water in the high temperature water tank 4. Output of the high temperature water temperature sensor 64 is used for a control to maintain the temperature of the high temperature water in the high temperature water tank 4 to the set high temperature, more concretely, for a control of quantity of a heating medium flowing through the high temperature water temperature adjusting means of the high temperature water tank 4.

By operating the high temperature water transfer pump 8 in the state that the low temperature water supply opening/closing valve 52 and low temperature water return opening/closing valve 55 are closed and the high temperature water supply opening/closing valve 53 and high temperature water return opening/closing valve 54 are opened, the high temperature water from the high temperature water tank 4 flows through heat medium passages in the fixed mold 104 and movable mold 105 so that the fixed mold 104 and movable mold 105 are heated.

At this time, if operation of the low temperature water transfer pump 6 is continued, as the low temperature water fed into the feed side piping 36 from the low temperature water tank 3 returns into the low temperature water tank 3 through the low temperature water return piping 37b of which flow passage is throttled by the low temperature water pressure adjusting valve 61, a hydraulic pressure in the feed side piping 36 is elevated to a predetermined value. The feed side piping 36 is connected to a lower portion of a heat recovery tank 25 and an upper portion of this heat recovery tank 25 communicates with the high temperature water tank 4 via a high temperature water transfer piping 44. Hence, the hydraulic pressure in the feed side piping 36 acts on the interior of the high temperature water tank 4 via the heat recovery tank 25 to thereby elevate a saturation vapor pressure of the high temperature water in the high temperature water tank 4. Thus, the temperature of the high temperature water becomes possible to be adjusted and maintained to 100° C. or higher.

By closing the high temperature water supply opening/closing valve 53 and high temperature water return opening/closing valve 54 and by stopping the operation of the high temperature water transfer pump 8, circulation of the high temperature water is stopped. Then, by opening the low temperature water supply opening/closing valve 52 and low temperature water return opening/closing valve 55, the low temperature water from the low temperature water tank 3 is circulated to flow through the fixed mold 104 and movable mold 105 so that the fixed mold 104 and movable mold 105 can be cooled.

The heat recovery tank 25 connected to the high temperature water tank 4 via the high temperature water transfer piping 44 is formed in a longitudinally elongating cylindrical shape having an inner volume larger than the total of inner volumes of heat medium flow passages of the fixed mold 104 and movable mold 105 and inner volumes of the high temperature water supply piping 41a, low temperature water supply piping 31d, low temperature water return piping 35a (between the heat medium outlets of the fixed mold 104 and movable mold 105 and the return piping jointing portion A) and high temperature water return piping 42b. Thereby, the heat recovery tank 25 functions to suppress mixing of the high temperature water and low temperature water.

The mold temperature adjusting apparatus 1' constructed as mentioned above is controlled by the molding machine control unit 115 and the mold temperature control unit 132 associated therewith, as follows:

In FIG. 15, mechanical parts and components arranged integrally or adjacently are collectively shown. Also, pipings (heat medium pipings and hydraulic pressure pipings) are shown by double lines and electrical signal wirings by single lines.

In FIG. 15, the mold temperature control unit 132 comprises a central control processing unit (CPU), a storage circuit storing set values, measured values, display image data, etc. and an input/output circuit. An image displaying panel (This is sometimes referred to as an injection molding condition setting and image displaying panel.) 133 as well as a setting means 146 are provided being kept at hand of operator. The image displaying panel 133 comprises a touch key type image displaying panel as shown in FIG. 16.

In the display image of the image displaying panel 133, a mold temperature set position, timer operation start position, etc. in the molding step can be specified by touch keys. Set values of temperature, time, etc. are inputted by a numeric keypad provided in the setting means 146.

The mold temperature control unit 132 makes comparison between the temperature of the low temperature water in the low temperature water tank 3 detected by the low temperature water temperature sensor 63 and the low temperature water temperature set value set by the setting means 146 (that is, TLW shown in FIG. 16) and adjusts a flow rate of the cooling medium to be fed into the low temperature water temperature adjusting means (heat exchanger) of the low temperature water tank 3 so that no deflection is caused between these two temperatures, or so that the temperature of the low temperature water in the low temperature water tank 3 is maintained to the low temperature water set low temperature. It is to be noted that the flow rate of the cooling medium is adjusted by controlling an electromagnetic valve (not shown).

Likewise, the mold temperature control unit 132 makes comparison between the temperature of the high temperature water in the high temperature water tank 4 detected by the high temperature water temperature sensor 64 and the high temperature water temperature set value set by the setting means 146 (that is, THW in FIG. 16) and adjusts a flow rate of the heating medium to be fed into the high temperature water temperature adjusting means (heat exchanger) of the high temperature water tank 4 so that no deflection is caused between these two temperatures, or so that the temperature of the high temperature water in the high temperature water tank 4 is maintained to the high temperature water set high temperature. It is to be noted that the temperature of the high temperature water can be stably maintained to a set high temperature of 100° C. or higher by elevating a saturation temperature of steam in the high temperature water tank 4 by a hydraulic pressure adjusting function of the low temperature water pressure adjusting valve 61.

The molding machine control unit 115 controls to change over the hydraulic pressure change-over valve 116 in accordance with a program of the molding steps so as to feed working fluid into the respective hydraulic cylinders sharing in the molding steps of the injection molding machine and also controls to drive a motor to rotationally drive the injection screw 107 for plasticization of the resin.

The mold temperature control unit 132 makes comparison between the actual temperature of the fixed mold 104 and movable mold 105 detected by the mold temperature sensor 62 and a set temperature (This is a target temperature set by the setting means 146.) of the fixed mold 104 and movable mold 105 corresponding to each of the molding steps and, when the actual temperature of the fixed mold 104 and movable mold 105 coincides with the set temperature corresponding to the respective molding steps, instructs the molding machine control unit 115 to proceed to the next molding step as well as instructs the mold temperature adjusting apparatus 1' to set the timer so as to decide the timing to change over the heat medium to be fed into the fixed mold 104 and movable mold 105 or to change over the heating and cooling of these molds 104, 105.

Next, the molding steps of the injection molding machine and functions of the mold temperature adjusting apparatus 1' associated therewith will be described with reference to FIGS. 14 to 17.

In order to carry out the heating of the fixed mold 104 and movable mold 105 before filling the molten resin or the cooling of the fixed mold 104 and movable mold 105 after filling the molten resin, the setting means 146 previously sets the high temperature water temperature set value THW, low temperature water temperature set value TLW, heating over-shooting temperature correction value ΔTH at the time of heating the mold, cooling over-shooting temperature correction value ΔTL at the time of cooling the mold, resin filling start mold temperature TH at the time to start the filling step, mold opening start temperature TL at the time to finish the cooling and high temperature heat medium supply start temperature set value ΔTL2 at the time to start the supply of the high temperature water after stopping the supply of the low temperature water.

By the way, in a substance having a large thermal capacity, such as the fixed mold 104 and movable mold 105, the heat transmission velocity is slow.

For this reason, even if the feed of the heat medium is stopped at the time when the temperature of the fixed mold 104 and movable mold 105 has reached the set temperature, such a phenomenon occurs that the temperature still changes. That is, at the time of heating, such a phenomenon occurs that the temperature of the fixed mold 104 and movable mold 105 exceeds the set temperature after the feed of the heat medium is stopped (over-shooting phenomenon). Also, at the time of cooling, such a phenomenon occurs that the temperature of the fixed mold 104 and movable mold 105 becomes lower than the set temperature after the feed of the heat medium is stopped (under-shooting phenomenon).

The above-mentioned heating over-shooting temperature correction value ΔTH and cooling under-shooting temperature correction value ΔTL mean an elevated temperature and a lowered temperature, respectively, of the fixed mold 104 and movable mold 105 after the feed of the heat medium is stopped.

In order to set the high temperature water temperature set value THW, low temperature water temperature set value TLW or other values, operator touches respective rectangular frames designated with the high temperature water temperature set value THW, low temperature water temperature set value TLW, etc. in the image of the image displaying panel 133 (FIG. 16) and then inputs numerical values in the respective frames by a numerical keypad provided on the setting means 146.

The heating over-shooting temperature correction value ΔTH is a predicted elevated temperature value restricting the timing to stop the feed of the high temperature heat medium so that over-shooting of the temperature of the fixed mold 104 and movable mold 105 is suppressed. Also, the cooling under-shooting temperature correction value ΔTL is a predicted lowered temperature value restricting the timing to stop the feed of the low temperature heat medium so that under-shooting of the temperature of the fixed mold 104 and movable mold 105 is suppressed.

These heating over-shooting temperature correction value ΔTH and cooling under-shooting temperature correction value ΔTL can be predicted by the following method.

That is, in the state that the mold is not filled with the resin (dry cycle), the fixed mold 104 and movable mold 105 are heated and cooled and a time constant of temperature changes of the fixed mold 104 and movable mold 105 is actually measured. This time constant corresponds to the thermal capacity of the fixed mold 104 and movable mold 105 and the larger is the time constant, the more remarkable become the above-mentioned over-shooting and under-shooting. Hence, based on this time constant, the heating over-shooting temperature correction value ΔTH and cooling under-shooting temperature correction value ΔTL are predicted to be set.

In the image displaying panel 133, an actually measured wave shape of the mold temperature changes in case the mold as a single unit is heated and cooled (dry cycle) can be displayed as an image in a screen of the image displaying panel 133. Where a sample mold is used as the mold 2, in a dry cycle using high temperature water of 145° C. and low temperature water of 22° C., temperature of the mold 2 is elevated and lowered. The result of measurements of the temperature is then displayed in the image of the image displaying panel 133 in which the injection molding conditions are set, as exemplified in FIG. 17.

FIG. 17 is a schematic view showing one example of an image showing an actually measured wave shape of temperature changes of the mold 2 when the mold 2 as a single unit is heated and cooled for setting initial molding conditions. From FIG. 17, a mode of changes of the temperature elevation and temperature lowering of the mold 2 can be known and this serves to shorten the molding conditions.

Where the mold temperature at the time of starting the injection is 120° C., if the temperature change at the time corresponding to the temperature of around 120° C. is seen, a temperature elevation of 15° C. in 5 seconds is observed. Also, around the temperature of 70° C. at the time of stopping the cooling, a temperature lowering of 20° C. in about 10 seconds is observed.

Thus, based on such temperature changes of the mold and such temperature elevation and lowering, the mold temperature control unit 132 calculates the time constant and, based on this time constant, predicts the heating over-shooting temperature correction value ΔTH and cooling under-shooting temperature correction value ΔTL.

(Operation of Mold Heating)

The mold temperature control unit 132 judges whether or not the measured values detected by the low temperature water temperature sensor 63 and high temperature water temperature sensor 64 have reached the set temperatures of the low temperature water temperature set value TLW and high temperature water temperature set value THW, respectively, in the state that all the opening/closing values 52 to 55 are closed and, upon confirming that the measured values have reached the respective set temperatures, controls to open the high temperature water supply opening/closing valve 53 and high temperature water return opening/closing valve 54 as well as to start operation of the high temperature water transfer pump 8. Thereby, the high temperature water is supplied into the fixed mold 104 and movable mold 105.

Then, as soon as the CPU of the mold temperature control unit 132 judges that the mold temperature has reached the high temperature fluid stop temperature TH−ΔTH (see FIG. 16), based on a command from this CPU, the high temperature water supply opening/closing valve 53 and high temperature water return opening/closing valve 54 are closed and the high temperature water transfer pump 8 is stopped. Thereby, the supply of the high temperature water into the mold is stopped.

(Operation of Resin Filling and Mold Cooling)

The injection unit 110 is in a stand-by position in the state that the molten resin is accumulated in a terminal end portion of the injection cylinder 106.

When the mold temperature is elevated by the heating over-shooting temperature correction value ΔTH beyond the high temperature fluid stop temperature TH-ΔTH to reach the resin filling start mold temperature TH, a screw operating command signal is sent to the molding machine control unit 115 from the mold temperature control unit 132. Thereby, the injection screw 107 is operated to advance toward the mold and the filling step to fill the resin into the mold cavity is started.

The fact that the temperature of the fixed mold 104 and movable mold 105 has reached the resin filling start mold temperature TH can be known by an output of the mold temperature sensor 62. But the over-shooting time S1 (hereinafter sometimes referred to as a high temperature maintaining time set value) in which the temperature of the fixed mold 104 and movable mold 105 is elevated to the resin filling start mold temperature TH from the high temperature fluid stop temperature TH−ΔTH can be predicted by the time constant actually measured in the above-mentioned dry cycle. Thus, the construction may also be made such that by measuring the high temperature maintaining time set value S1 from the time point when the mold temperature has reached the high temperature fluid stop temperature TH−ΔTH, the time point when the mold temperature reaches the resin filling start mold temperature TH is recognized. In this case, the high temperature maintaining time set value S1 can be measured by the timer.

As soon as the resin filling into the mold cavity is started, the low temperature water supply opening/closing valve 52 and high temperature water return opening/closing valve 54 are opened by the mold temperature control unit 132. Thereby, the low temperature water is supplied into the fixed mold 104 and movable mold 105 so that the high temperature water in the heat medium passages of the fixed mold 104 and movable mold 105 is discharged to be replaced with the low temperature water.

After the replacement of the high temperature water with the low temperature water has been finished (that is, after the high temperature water recovery time set value S3, shown in FIG. 16, has passed from the time point when the low temperature water supply opening/closing valve 52 is opened), the mold temperature control unit 132 controls to open the low temperature water return opening/closing valve 55 as well as to close the high temperature water return opening/closing valve 54 provided in the high temperature water return piping 42b. Thereby, the low temperature water is circulated to be supplied into the mold and the mold cooling step is commenced.

The above-mentioned high temperature water recovery time set value S3 can be predicted by the time constant measured in the above-mentioned dry cycle. Thus, the time point when the replacement of the high temperature water in the heat medium passages of the fixed mold 104 and movable mold 105 with the low temperature water is finished can be recognized by measuring the high temperature water recovery time set value S3 by the timer.

(Operation of Change-Over the Heat Medium in the Mold and Mold Opening)

When the mold temperature has reached the low temperature fluid stop temperature TL+ΔTL, the mold temperature control unit 132 controls to close the low temperature water supply opening/closing valve 52 and low temperature water return opening/closing valve 55 to thereby stop the supply of the low temperature water into the mold. Also, after the mold temperature has reached a high temperature heat medium supply start temperature set value TL+ΔTL2 obtained by adding a high temperature heat medium supply start temperature correction value ΔTL2, which is smaller than the cooling under-shooting temperature correction value ΔTL (ΔTL2<ΔTL), to the mold opening start temperature TL, or after a low temperature maintaining time set value SH, as shown in FIG. 16, that is a time in which the temperature of the fixed mold 104 and movable mold 105 lowers to the high temperature heat medium supply start temperature set value TL+ΔTL2 from the low temperature fluid stop temperature TL+ΔTL, has passed, the mold temperature control unit 132 controls to open the high temperature water supply opening/closing valve 53. Thereby, the high temperature water is supplied into the fixed mold 104 and movable mold 105 so that the low temperature water in the heat medium passages of the fixed mold 104 and movable mold 105 is discharged to be replaced with the high temperature water.

The fact that the temperature of the fixed mold 104 and movable mold 105 has reached the high temperature heat medium supply start temperature set value TL+ΔTL2 can be known by an output of the mold temperature sensor 62. But the low temperature maintaining time set value SH can be predicted by the time constant actually measured in the above-mentioned dry cycle. Thus, the construction may also be made such that by measuring the low temperature maintaining time set value SH from the time point when the mold temperature has reached the low temperature fluid stop temperature TL+ΔTL, the time point when the mold temperature reaches the high temperature heat medium supply start temperature set value TL+ΔTL2 is recognized. In this case, the low temperature maintaining time set value SH can be measured by the timer.

When the mold temperature lowers to the mold opening start temperature TL, a mold opening command signal is sent to the molding machine control unit 115 from the mold temperature control unit 132. Thereby, the fixed mold 104 and movable mold 105 are opened to be separated from each other and the molded article is taken out. Thereafter, the fixed mold 104 and movable mold 105 are closed to be jointed together and keep a stand-by state.

The fact that the temperature of the fixed mold 104 and movable mold 105 has reached the mold opening start temperature TL can be known by an output of the mold temperature sensor 62. But the time (under-shooting time S2) in which the mold temperature lowers to the mold opening start temperature TL from the low temperature fluid stop temperature TL+ΔTL can be predicted by the time constant actually measured in the above-mentioned dry cycle. Thus, the construction may also be made such that by measuring the under-shooting time S2 from the time point when the mold temperature has reached the low temperature fluid stop temperature TL+ΔTL, the time point when the mold temperature reaches the mold opening start temperature TL is recognized. In this case, the under-shooting time S2 can be measured by the timer.

(Operation of Mold Re-Heating)

As mentioned above, by opening the high temperature water supply opening/closing valve 53, the low temperature water remaining in the heat medium passages of the mold is discharged by the high temperature water. At the time when the low temperature water is replaced with the high temperature water, the high temperature water return opening/closing valve 54 is opened and the low temperature water return opening/closing valve 55 of the low temperature water return piping 35b is closed. Thereby, the circulation for supply of the high temperature water is continued and the mold re-heating step is commenced.

The time when the low temperature water is replaced with the high temperature water can be predicted by the time constant actually measured in the above-mentioned dry cycle. Thus, by measuring such predicted time after the high temperature water supply opening/closing valve 53 has been opened, the time point when the replacement of the low temperature water with the high temperature water is finished can be recognized.

The mold temperature control unit 132 causes the image displaying means to display the actually measured values of the mold temperature in the above-mentioned steps for each one cycle of the molding steps, as shown in the lower portion of the screen of FIG. 16. Based on this display, the operator makes corrections of the set values of the high temperature water temperature set value THW, low temperature water temperature set value TLW, heating over-shooting temperature correction value ΔTH, cooling under-shooting temperature correction value ΔTL and high temperature heat medium supply start temperature correction value ΔTL2 so that the molding conditions of the resin by the injection molding machine are optimized and the molding cycle is shortened to the minimum.

The injection molding condition setting and image displaying panel 133 may also be constructed such that the images of the upper portion and lower portion of the image displaying panel of FIG. 16 are displayed being changed over to each other on the same one screen. By so doing, the injection molding condition setting and image displaying panel 133 can be made small sized and less expensive.

According to the present second embodiment, the high temperature water temperature set value THW, low-temperature water temperature set value TLW, heating over-shooting temperature correction value ΔTH and cooling under-shooting temperature correction value ΔTL can be respectively appropriately set and thereby the molding cycle can be shortened to the minimum. Also, in the displaying panel of the image displaying panel 133, the set values and actually measured values of the mold temperature for each of the molding steps of the molding machine can be compared with each other. Thereby, an optimal change pattern of the mold temperature can be easily set.

Third Embodiment

Figure 18:
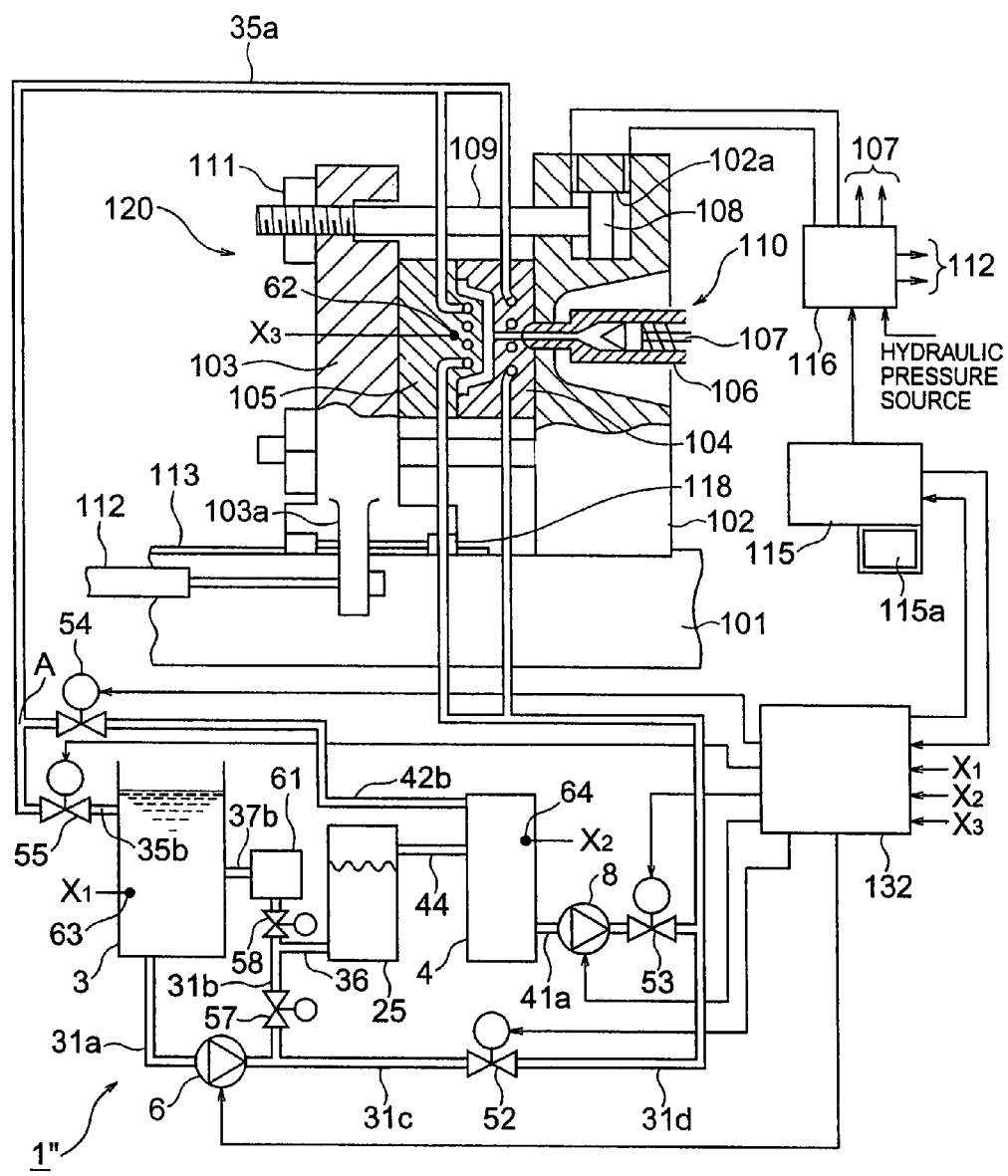
FIG. 18 is a schematic piping diagram of a mold temperature adjusting apparatus of a molding machine of a third embodiment according to the present invention, including a cross sectional view of a mold portion of an injection molding machine.
Figure 19:
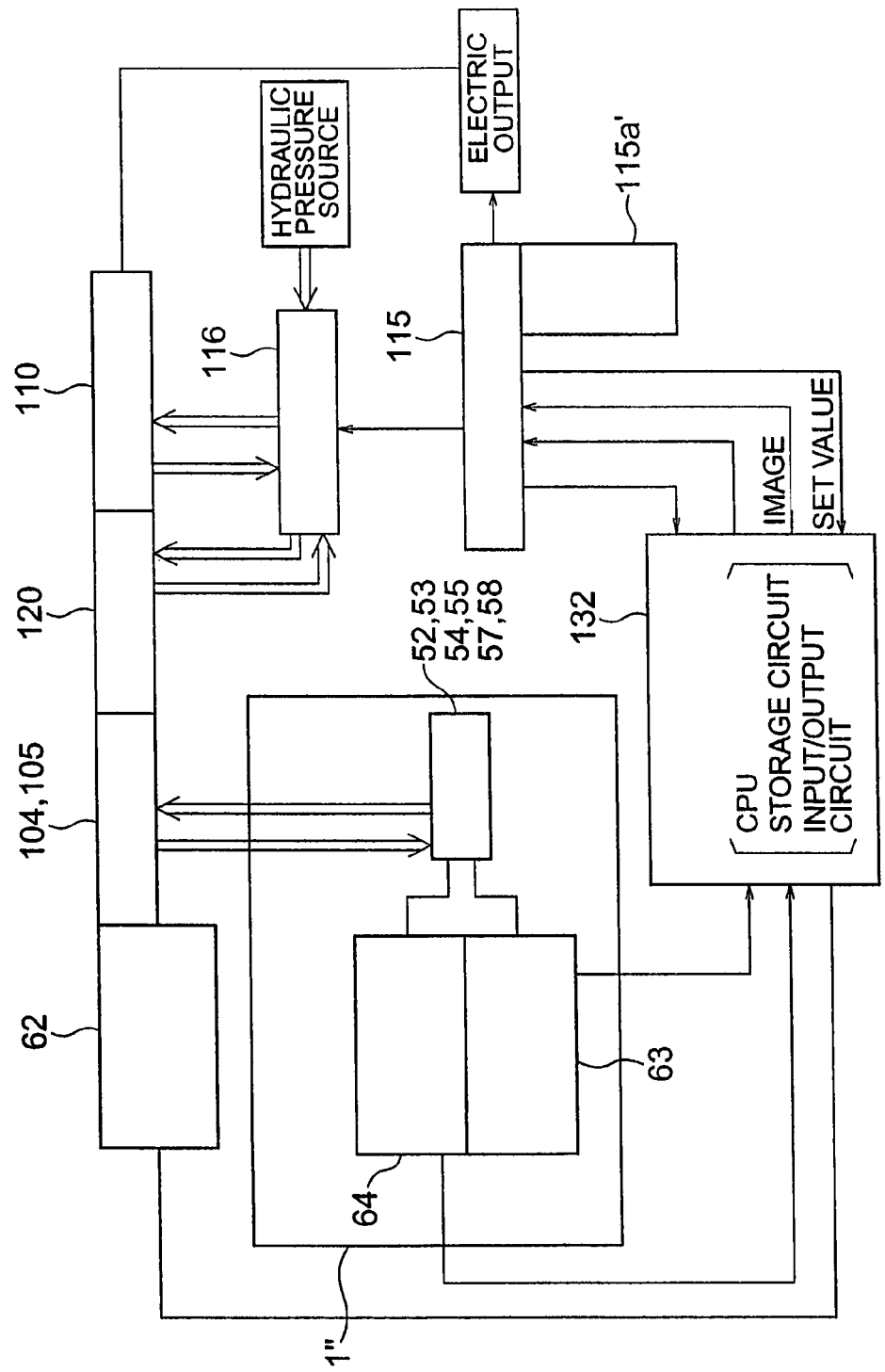
FIG. 19 is a block diagram showing a temperature adjusting control system of the mold temperature adjusting apparatus of the third embodiment of FIG. 17.

Next, a third embodiment of a mold temperature adjusting apparatus 1" and method according to the present invention will be described with reference to FIGS. 18 and 19.

The present third embodiment is substantially the same as the second embodiment except that the injection molding condition setting and image displaying panel 133 and setting means 146 shown in FIGS. 14 and 15 are eliminated and their functions are taken charge of by the setting and displaying means 115a.

That is, the setting and displaying means 115a comprises an image displaying panel of touch key type as shown in FIG. 16, on which the image of FIG. 16 is displayed when a first display mode is set by operation of touch keys or the like.

In this case, the mold temperature set positions, timer operation start positions, etc. in the molding steps, as mentioned above, can be specified by touch keys and set values of temperature, time, etc. corresponding to the positions so specified can be inputted by a numeric keypad (not shown).

The set values of the mold temperature control condition displayed on the injection molding condition setting and image displaying panel 133 are transferred to the mold temperature control unit 132 from the molding machine control unit 115 so that the above-mentioned control of the mold temperature is carried out.

Also, the actually measured values of the mold temperature are transferred to the molding machine control unit 115 from the mold temperature control unit 132 to be displayed on the injection molding condition setting and image displaying panel 133, as shown in the lower portion of FIG. 16.

On the other hand, when a second display mode is set by operation of touch keys or the like, an image for setting the molding conditions is displayed on the injection molding condition setting and image displaying panel 133. In this case, set positions of the molding conditions, such as an injection pressure, injection velocity, pressure maintaining time, etc. can be specified by touch keys and set values corresponding to the positions so specified can be inputted by the numeric keyboard.

Based on the set values displayed on the injection molding condition setting and image displaying panel 133, the molding machine control unit 115 controls a drive hydraulic pressure of the die plate moving hydraulic cylinder 112, mold clamping hydraulic cylinder 102a, injection screw 107, etc. and also causes the actually measured values of the injection pressure, etc. to be displayed on the injection molding condition setting and image displaying panel 133.

According to the present third embodiment, by selecting the first display mode, set values, of the mold temperature control conditions and actually measured values of the mold temperature can be displayed. Also, by selecting the second display mode, set values of the molding conditions and actually measured values of the injection pressure, injection velocity, etc. can be displayed. Thereby, workability of the operator can be enhanced. Also, neither an image display means nor a setting means is needed to be provided on the mold temperature control unit 132 and a cost reduction of the apparatus can be realized.

In the above, while several examples of the mold temperature adjusting apparatus and method as well as the mold temperature control unit of the present invention have been described based on the embodiments, the present invention is not limited thereto but, needless to mention, may be added with various modifications in the concrete structure within the scope of the claims of the invention as appended herein.

For example, in the mold temperature adjusting apparatus of the embodiments according to the present invention, while the examples of using water as the heat medium have been described, the heat medium is not limited thereto but various fluids other than water, such as oil, steam or the like, can be used.

What is claimed is:

1. A mold temperature adjusting method using a high temperature fluid supply system (41) supplying a fluid of high temperature into a mold (2), a low temperature fluid tank (3), a low temperature fluid transfer pump (6,7), a low temperature fluid supply system (31) supplying the fluid into said mold (2) from said low temperature fluid tank (3), a low temperature fluid return system (35) returning the fluid into said low temperature fluid tank (3) from said mold (2) and a low temperature fluid by-pass system (40) connecting said low temperature fluid supply system (31) and said low temperature fluid return system (35) to each other so that a control of a mold temperature of said mold (2) is effected by a high temperature heat medium and low temperature heat medium predetermined temperatures being selectively caused to flow in a heat medium passage provided in said mold (2), wherein said mold temperature adjusting method includes the steps of: actually measuring a mold temperature of said mold (2); and while said mold (2) is heated, stopping supply of the high temperature heat medium into said mold (2) through said high temperature fluid supply system (41) when the mold temperature is elevated to a high temperature fluid stop temperature TH−ΔTH obtained by subtracting a heating over-shooting temperature correction value ΔTH from a predetermined resin filling start mold temperature TH and while said mold (2) is cooled, stopping supply of the low temperature heat medium into said mold (2) through said low temperature fluid supply system (31) when the mold temperature is lowered to a low temperature fluid stop temperature TL+ΔTL1 obtained by adding a cooling under-shooting temperature correction value ΔTL1 to a predetermined mold opening start temperature TL, said heating over-shooting temperature correction value ΔTH being a predicted elevated temperature value regulating a supply stop timing of the high temperature heat medium so that over-shooting of the mold temperature is suppressed, said cooling under-shooting temperature correction value ΔTL1 being a predicted lowered temperature value regulating a supply stop timing of the low temperature heat medium so that under-shooting of the mold temperature is suppressed, wherein the supply of the high temperature heat medium into said mold (2) is started when the mold temperature is lowered to a high temperature heat medium supply start temperature set value TL+ΔTL2 obtained by adding a high temperature heat medium supply start temperature correction value ΔTL2, which is smaller than the cooling under-shooting temperature correction value ΔTL1 (ΔTL2<ΔTL1), to the mold opening start temperature TL and the supply of the low temperature heat medium into said mold (2) is started when the mold temperature is elevated to the resin filling start mold temperature TH.

2. A mold temperature adjusting method as claimed in claim 1, wherein a progress of temperature elevation corresponding to the heating over-shooting temperature correction value $\Delta TH$ is recognized by a mold temperature sensor (62) actually measuring the mold temperature or by a timer means measuring an over-shooting time S1 predicted as needed for the mold temperature to be elevated to the resin filling start mold temperature TH from the high temperature fluid stop temperature TH$-\Delta TH$ as well as a progress of temperature lowering corresponding to the cooling under-shooting temperature correction value $\Delta TL1$ is recognized by said mold temperature sensor (62) actually measuring the mold temperature or by a timer means measuring an under-shooting time S2 predicted as needed for the mold temperature to be lowered to the mold opening start temperature TL from the low temperature fluid stop temperature TL$+\Delta TL1$.

3. A mold temperature adjusting method as claimed in claim 2, wherein said over-shooting time S1 is predicted based on a time constant of temperature changes of said mold (2) when said mold (2) as a single unit is heated as well as said under-shooting time S2 is predicted based on a time constant of temperature changes of said mold (2) when said mold (2) as a single unit is cooled.

4. A mold temperature adjusting method as claimed in claim 1, wherein the time when the mold temperature is lowered to the high temperature heat medium supply start temperature set value TL$+\Delta TL2$ is recognized by a mold temperature sensor (62) actually measuring the high temperature heat medium supply start temperature set value TL$+\Delta TL2$ or by a timer means measuring a low temperature maintaining time set value SH predicted as needed for the mold temperature to be lowered to the high temperature heat medium supply start temperature set value TL$+\Delta TL2$ from the low temperature fluid stop temperature TL$+\Delta TL2$.

5. A mold temperature adjusting method as claimed in claim 1, further including the steps of: setting mold temperature control conditions of the temperatures of the high temperature heat medium and low temperature heat medium, resin filling start mold temperature TH, heating over-shooting temperature correction value $\Delta TH$, mold opening start temperature TL, cooling under-shooting temperature correction value $\Delta TL1$ and high temperature heat medium supply start temperature correction value $\Delta TL2$; and displaying on an injection molding condition setting and image displaying panel (133) a first image showing a reference mold temperature curve of a molding step added with the mold temperature control conditions and a second image showing actually measured temperature changes of said mold (2) in an actual molding step.

6. A mold temperature adjusting method as claimed in claim 1, wherein said heating over-shooting temperature correction value $\Delta TH$ is predicted based on a time constant of temperature changes of said mold (2) when said mold (2) as a single unit is heated and said cooling under-shooting temperature correction value $\Delta TL1$ is predicted based on a time constant of temperature changes of said mold (2) when said mold (2) as a single unit is cooled.

* * * * *